(12) United States Patent
Gaviola et al.

(10) Patent No.: US 12,524,512 B2
(45) Date of Patent: Jan. 13, 2026

(54) DIGITAL IDENTIFICATION CREDENTIAL USER INTERFACES

(71) Applicant: Apple Inc., Cupertino, CA (US)

(72) Inventors: Haya Iris V. Gaviola, San Jose, CA (US); Thomas J. Miller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 18/204,334

(22) Filed: May 31, 2023

(65) Prior Publication Data

US 2023/0394128 A1    Dec. 7, 2023

Related U.S. Application Data

(60) Provisional application No. 63/349,071, filed on Jun. 4, 2022.

(51) Int. Cl.
*G06F 21/32*    (2013.01)
*G06F 3/0482*    (2013.01)

(52) U.S. Cl.
CPC ............ *G06F 21/32* (2013.01); *G06F 3/0482* (2013.01); *G06F 2221/2149* (2013.01)

(58) Field of Classification Search
CPC . G06F 21/32; G06F 3/0482; G06F 2221/2149
See application file for complete search history.

(56) References Cited

U.S. PATENT DOCUMENTS

| 8,827,153 | B1 | 9/2014 | Rhoades et al. |
| 10,032,100 | B2 | 7/2018 | Mullen et al. |
| 10,223,631 | B2 | 3/2019 | Mullen et al. |
| 10,234,953 | B1 | 3/2019 | Li et al. |
| 10,255,545 | B2 | 4/2019 | Mullen et al. |
| 10,503,912 | B1 | 12/2019 | Kerr |
| 10,803,400 | B2 | 10/2020 | Sindia et al. |
| 11,127,013 | B1 | 9/2021 | Boyd et al. |
| 11,157,918 | B1 | 10/2021 | Ellison et al. |
| 11,182,774 | B1 | 11/2021 | Boyd et al. |
| 11,206,544 | B2 | 12/2021 | Boyd et al. |
| 11,615,199 | B1 | 3/2023 | Poder et al. |
| 11,748,507 | B2 | 9/2023 | Cool et al. |
| 2009/0320125 | A1 | 12/2009 | Pleasant et al. |
| 2011/0077983 | A1 | 3/2011 | Hua et al. |
| 2011/0126003 | A1 | 5/2011 | Engert |

(Continued)

FOREIGN PATENT DOCUMENTS

| CN | 101884188 A | 11/2010 |
| CN | 104823383 A | 8/2015 |

(Continued)

OTHER PUBLICATIONS

Final Office Action received for U.S. Appl. No. 17/951,818, mailed on Jan. 27, 2025, 31 pages.

(Continued)

*Primary Examiner* — Kristie D Shingles
(74) *Attorney, Agent, or Firm* — YHE Law LLP

(57) ABSTRACT

The present disclosure generally relates to digital identification credential user interfaces. A first application provides a request for digital identification information. A second application receive user input and, in response, provides the digital identification information to the first application.

48 Claims, 19 Drawing Sheets

(56) References Cited

U.S. PATENT DOCUMENTS

| | | |
|---|---|---|
| 2011/0231911 A1 | 9/2011 | White et al. |
| 2011/0282785 A1 | 11/2011 | Chin |
| 2012/0200390 A1 | 8/2012 | Saravanan |
| 2013/0024371 A1 | 1/2013 | Hariramani et al. |
| 2013/0073459 A1 | 3/2013 | Zacarias et al. |
| 2013/0304642 A1 | 11/2013 | Campos |
| 2014/0279519 A1 | 9/2014 | Mattes et al. |
| 2016/0006719 A1 | 1/2016 | Khalil et al. |
| 2016/0018525 A1 | 1/2016 | Lanzagorta |
| 2016/0050193 A1 | 2/2016 | Kanov et al. |
| 2016/0057138 A1 | 2/2016 | Hoyos et al. |
| 2016/0072794 A1 | 3/2016 | Engert |
| 2016/0078581 A1 | 3/2016 | Maher |
| 2016/0180332 A1 | 6/2016 | Wilczynski |
| 2016/0259497 A1 | 9/2016 | Foss et al. |
| 2016/0294831 A1 | 10/2016 | Borunda et al. |
| 2016/0300054 A1 | 10/2016 | Turgeman et al. |
| 2017/0032485 A1 | 2/2017 | Vemury |
| 2017/0091765 A1 | 3/2017 | Lloyd et al. |
| 2017/0103388 A1 | 4/2017 | Pillai et al. |
| 2017/0109901 A1 | 4/2017 | Raj |
| 2017/0124312 A1 | 5/2017 | Inoue |
| 2017/0169528 A1 | 6/2017 | Kundu et al. |
| 2017/0193001 A1* | 7/2017 | Agrawal ............. G06Q 10/10 |
| 2018/0108031 A1 | 4/2018 | Jones et al. |
| 2018/0165655 A1 | 6/2018 | Marcelle et al. |
| 2018/0165676 A1 | 6/2018 | Bhatt et al. |
| 2018/0167387 A1 | 6/2018 | Bhatt et al. |
| 2018/0260553 A1 | 9/2018 | Hoyos et al. |
| 2018/0335928 A1 | 11/2018 | Van Os et al. |
| 2018/0336327 A1* | 11/2018 | Wallace ............. G06Q 20/351 |
| 2018/0349581 A1 | 12/2018 | Ramalingam |
| 2018/0367946 A1 | 12/2018 | Best |
| 2019/0043148 A1 | 2/2019 | Vemury |
| 2019/0057412 A1 | 2/2019 | Bhattacharjee et al. |
| 2019/0080070 A1 | 3/2019 | Van Os et al. |
| 2019/0163876 A1 | 5/2019 | Remme et al. |
| 2019/0164165 A1 | 5/2019 | Ithabathula |
| 2019/0168036 A1 | 6/2019 | Conboy |
| 2019/0168410 A1 | 6/2019 | Conboy |
| 2019/0171998 A1 | 6/2019 | Conboy |
| 2019/0172149 A1 | 6/2019 | Conboy |
| 2019/0172161 A1 | 6/2019 | Conboy |
| 2019/0197527 A1 | 6/2019 | Agarwalla et al. |
| 2019/0213525 A1 | 7/2019 | Haci et al. |
| 2019/0220662 A1 | 7/2019 | Shenouda Dawoud |
| 2019/0287111 A1 | 9/2019 | Cvetkovich et al. |
| 2019/0304216 A1 | 10/2019 | Mendelson et al. |
| 2019/0327228 A1 | 10/2019 | Pantfoerder et al. |
| 2019/0355191 A1 | 11/2019 | Jones et al. |
| 2019/0370781 A1 | 12/2019 | Van Os et al. |
| 2019/0373320 A1* | 12/2019 | Balsamo ............. G06F 3/0485 |
| 2020/0020196 A1 | 1/2020 | Petersen et al. |
| 2020/0029173 A1 | 1/2020 | Pang et al. |
| 2020/0211031 A1 | 7/2020 | Patil |
| 2020/0302519 A1* | 9/2020 | Van Os ............. G06F 21/31 |
| 2020/0320653 A1 | 10/2020 | Hastings et al. |
| 2020/0349244 A1 | 11/2020 | Kim et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0049021 A1* | 2/2021 | De Jong ............. G06F 21/32 |
| 2021/0089635 A1 | 3/2021 | Weeresinghe |
| 2021/0266500 A1 | 8/2021 | Taylor et al. |
| 2021/0287768 A1 | 9/2021 | Craig et al. |
| 2021/0319862 A1 | 10/2021 | Boyd et al. |
| 2021/0321263 A1 | 10/2021 | Boyd et al. |
| 2021/0326426 A1* | 10/2021 | Bouse ............. G06F 16/2379 |
| 2021/0377742 A1 | 12/2021 | Boyd et al. |
| 2021/0392053 A1* | 12/2021 | Singh ............. G06F 3/04842 |
| 2021/0392125 A1 | 12/2021 | Bryson |
| 2022/0011999 A1 | 1/2022 | Lovelock et al. |
| 2022/0277295 A1 | 9/2022 | Robinson-Morgan et al. |
| 2022/0365643 A1* | 11/2022 | Triverio ............. H04L 51/046 |
| 2022/0391481 A1 | 12/2022 | Villanueva Gaviola et al. |
| 2022/0391482 A1* | 12/2022 | Villanueva Gaviola ..................... G06F 3/0482 |
| 2023/0045850 A1 | 2/2023 | Sammoura et al. |
| 2023/0089689 A1 | 3/2023 | Pons Bordes et al. |
| 2024/0104188 A1 | 3/2024 | Villanueva Gaviola et al. |
| 2024/0147243 A1 | 5/2024 | Villanueva Gaviola et al. |
| 2024/0403481 A1 | 12/2024 | V. Gaviola et al. |
| 2025/0142343 A1 | 5/2025 | Villanueva Gaviola et al. |

FOREIGN PATENT DOCUMENTS

| | | |
|---|---|---|
| CN | 105190659 A | 12/2015 |
| CN | 106453341 A | 2/2017 |
| CN | 109949120 A | 6/2019 |
| CN | 112819475 A | 5/2021 |
| JP | 2016-526211 A | 9/2016 |
| KR | 10-2062919 B1 | 1/2020 |
| WO | 2009/009788 A1 | 1/2009 |
| WO | 2014/105162 A1 | 7/2014 |
| WO | 2015/194135 A1 | 12/2015 |
| WO | 2016/196054 A1 | 12/2016 |
| WO | 2021/038298 A2 | 3/2021 |

OTHER PUBLICATIONS

Intention to Grant received for European Patent Application No. 22732745.9, mailed on Feb. 7, 2025, 14 pages.
Result of Consultation received for European Patent Application No. 22732745.9, mailed on Jan. 23, 2025, 4 pages.
International Preliminary Report on Patentability received for PCT Patent Application No. PCT/US2023/024123, mailed on Dec. 19, 2024, 7 pages.
International Search Report and Written Opinion received for PCT Patent Application No. PCT/US2024/031045, mailed on Sep. 26, 2024, 10 pages.
Advisory Action received for U.S. Appl. No. 17/485,086, mailed on Sep. 9, 2022, 5 pages.
Applicant Initiated Interview Summary received for U.S. Appl. No. 17/485,086, mailed on Apr. 26, 2022, 2 pages.
Applicant-Initiated Interview Summary received for U.S. Appl. No. 17/485,086, mailed on Dec. 23, 2022, 2 pages.
Corrected Notice of Allowance received for U.S. Appl. No. 17/485,098, mailed on Oct. 13, 2022, 8 pages.
Final Office Action received for U.S. Appl. No. 17/485,086, mailed on May 4, 2022, 21 pages.
International Search Report and Written Opinion received for PCT Patent Application No. PCT/US2022/030567, mailed on Dec. 9, 2022, 24 pages.
Invitation to Pay Additional Fees and Partial International Search Report received for PCT Patent Application No. PCT/US2022/030567, mailed on Sep. 13, 2022, 13 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.
Notice of Allowance received for U.S. Appl. No. 17/398,723, mailed on Feb. 23, 2023, 17 pages.
Notice of Allowance received for U.S. Appl. No. 17/485,086, mailed on Jan. 30, 2023, 9 pages.
Notice of Allowance received for U.S. Appl. No. 17/485,098, mailed on Aug. 5, 2022, 12 pages.
Corrected Notice of Allowance received for U.S. Appl. No. 17/398,723, mailed on Nov. 15, 2023, 12 pages.
International Preliminary Report on Patentability received for PCT Patent Application No. PCT/US2022/030567, mailed on Dec. 21, 2023, 18 pages.
International Search Report and Written Opinion received for PCT Patent Application No. PCT/US2023/024123, mailed on Sep. 15, 2023, 11 pages.

(56) References Cited

OTHER PUBLICATIONS

Non-Final Office Action received for U.S. Appl. No. 17/951,818, mailed on Sep. 9, 2024, 30 pages.
Notice of Allowance received for Chinese Patent Application No. 202310865934.0, mailed on May 8, 2024, 2 pages (1 page of English Translation and 1 page of Official Copy).
Notice of Allowance received for Japanese Patent Application No. 2023-528157, mailed on Feb. 5, 2024, 4 pages (1 page of English Translation and 3 pages of Official Copy).
Notice of Allowance received for U.S. Appl. No. 17/398,723, mailed on Jan. 30, 2024, 15 pages.
Notice of Allowance received for U.S. Appl. No. 17/398,723, mailed on Jun. 15, 2023, 15 pages.
Notice of Allowance received for U.S. Appl. No. 17/398,723, mailed on Oct. 26, 2023, 15 pages.
Office Action received for Chinese Patent Application No. 202310865934.0, mailed on Jan. 16, 2024, 12 pages (6 pages of English Translation and 6 pages of Official Copy).
Office Action received for European Patent Application No. 22732745.9, mailed on Apr. 10, 2024, 7 pages.
Office Action received for Japanese Patent Application No. 2023-528157, mailed on Dec. 8, 2023, 4 pages (2 pages of English Translation and 2 pages of Official Copy).
Summons to Attend Oral Proceedings received for European Patent Application No. 22732745.9, mailed on Sep. 3, 2024, 11 pages.
Result of Consultation received for European Patent Application No. 22732745.9, mailed on Jan. 15, 2025, 13 pages.
Applicant-Initiated Interview Summary received for U.S. Appl. No. 17/951,818, mailed on Nov. 4, 2024, 5 pages.
Notice of Allowance received for U.S. Appl. No. 18/404,058, mailed on Oct. 9, 2024, 12 pages.
Decision to Grant received for European Patent Application No. 22732745.9, mailed on May 22, 2025, 4 pages.
Non-Final Office Action received for U.S. Appl. No. 17/951,818, mailed on May 15, 2025, 32 pages.
Applicant-Initiated Interview Summary received for U.S. Appl. No. 17/951,818, mailed on Mar. 3, 2025, 5 pages.
Applicant-Initiated Interview Summary received for U.S. Appl. No. 17/951,818, mailed on Jun. 30, 2025, 4 pages.
Extended European Search Report received for European Patent Application No. 25175055.0, mailed on Jul. 17, 2025, 9 pages.
Office Action received for Chinese Patent Application No. 202410869730.9, mailed on May 28, 2025, 11 pages (6 pages of English Translation and 5 pages of Official Copy).
Office Action received for Japanese Patent Application No. 2024-032427, mailed on Apr. 21, 2025, 11 pages (5 pages of English Translation and 6 pages of Official Copy).
Final Office Action received for U.S. Appl. No. 17/951,818, mailed on Sep. 4, 2025, 33 pages.
Notice of Allowance received for Chinese Patent Application No. 202410869730.9, mailed on Sep. 29, 2025, 4 pages (1 page of English Translation and 3 pages of Official Copy).
Notice of Allowance received for Korean Patent Application No. 10-2023-7018460, mailed on Aug. 27, 2025, 7 pages (2 pages of English Translation and 5 pages of Official Copy).

\* cited by examiner

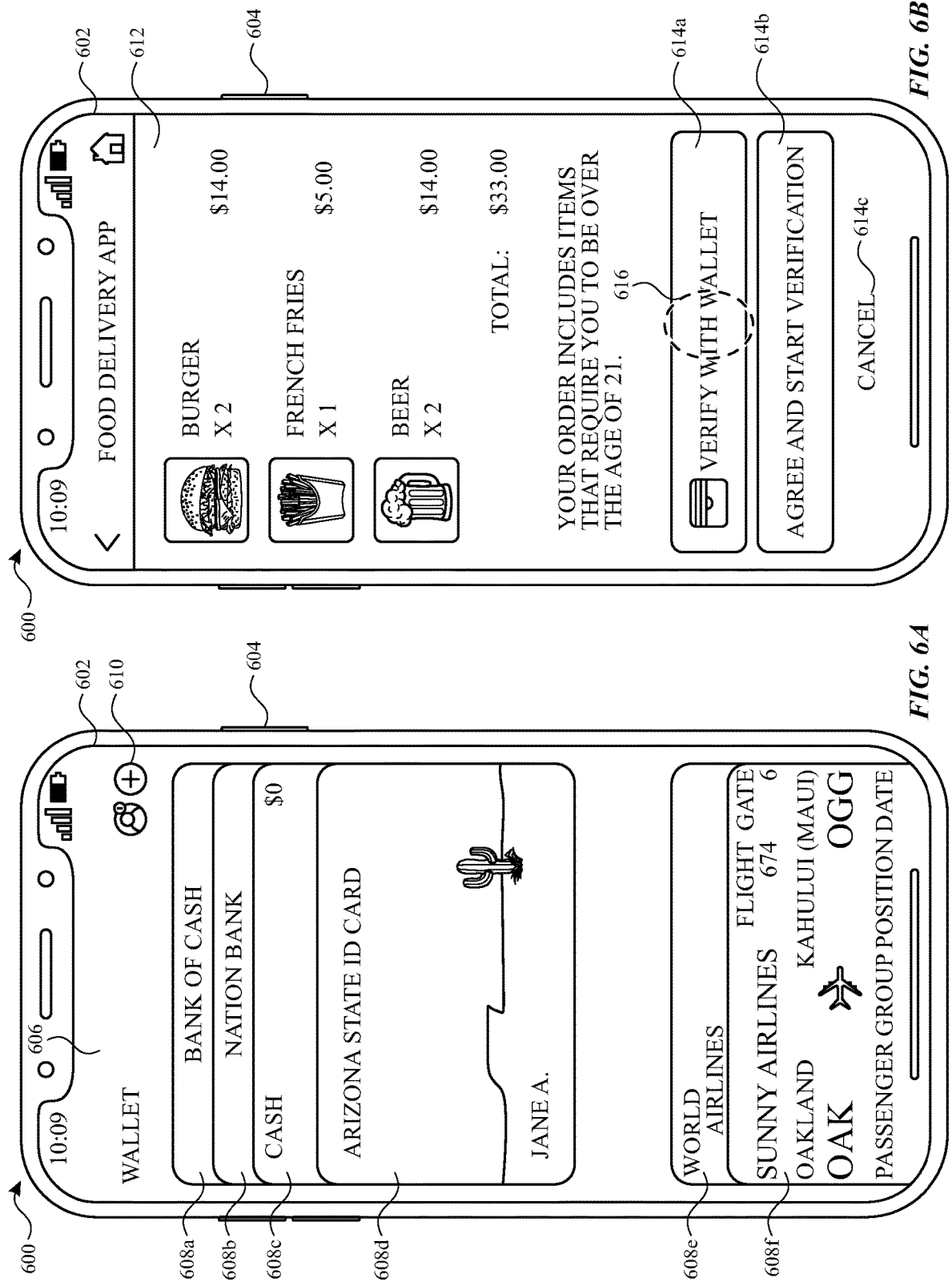

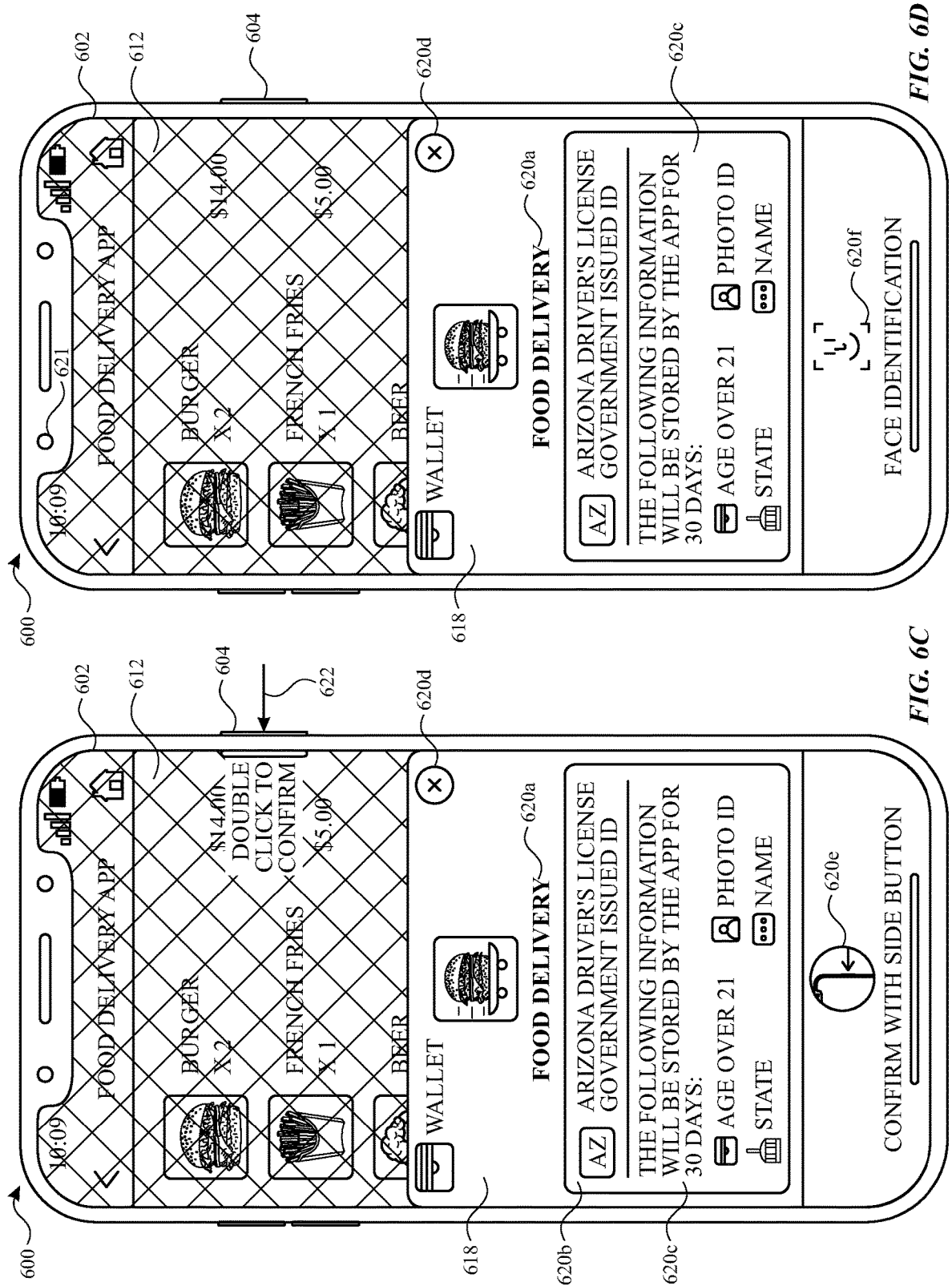

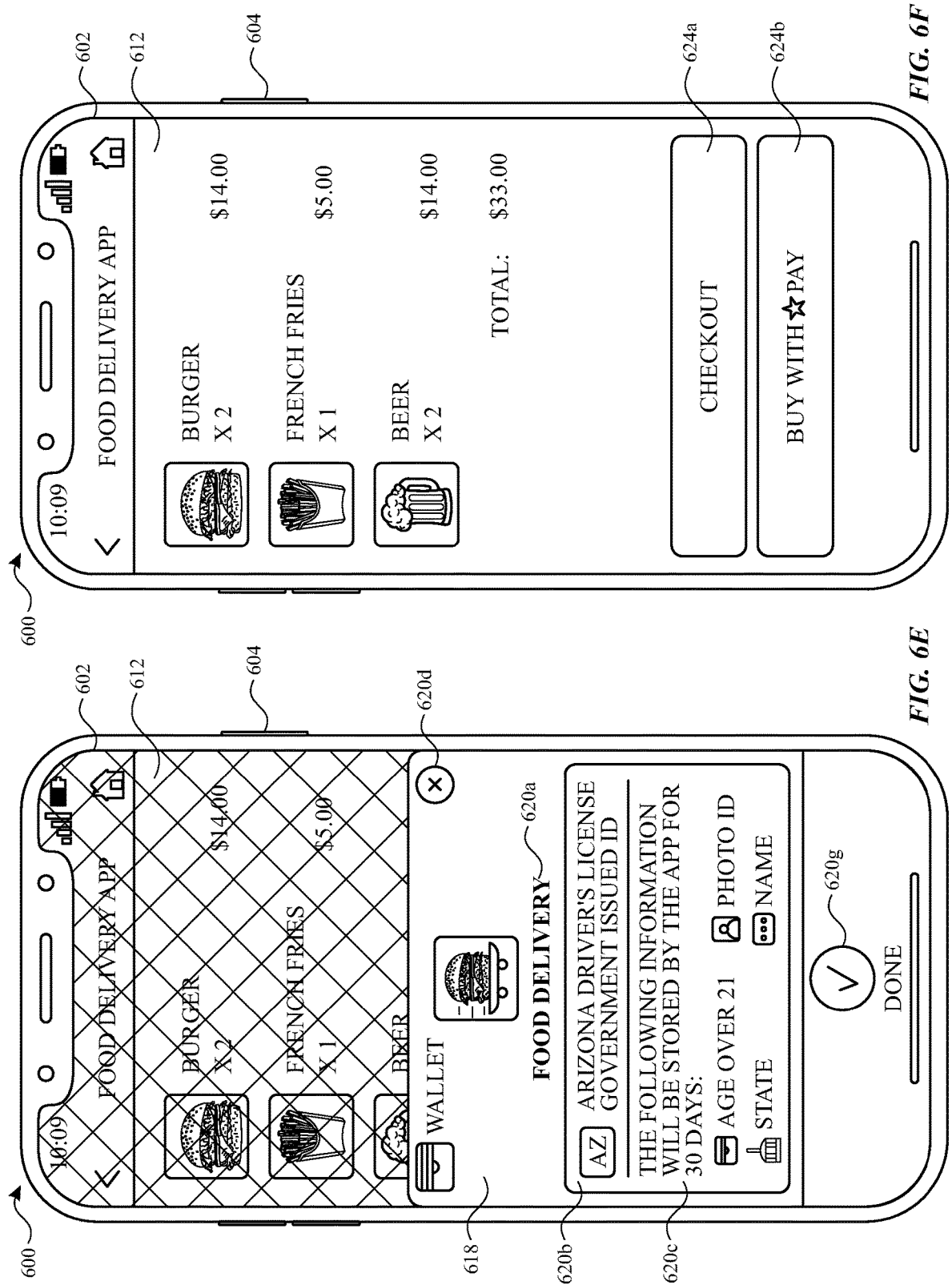

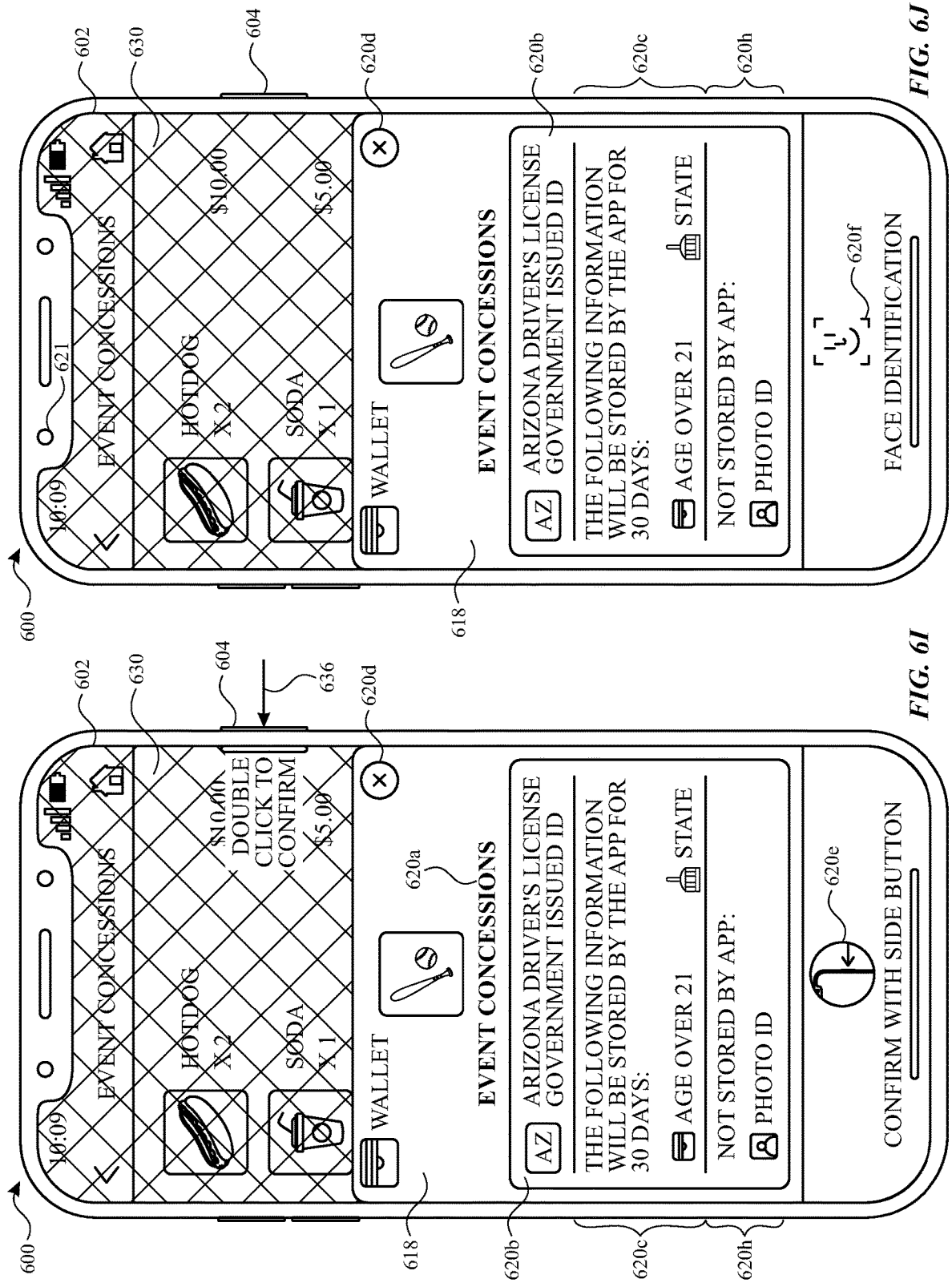

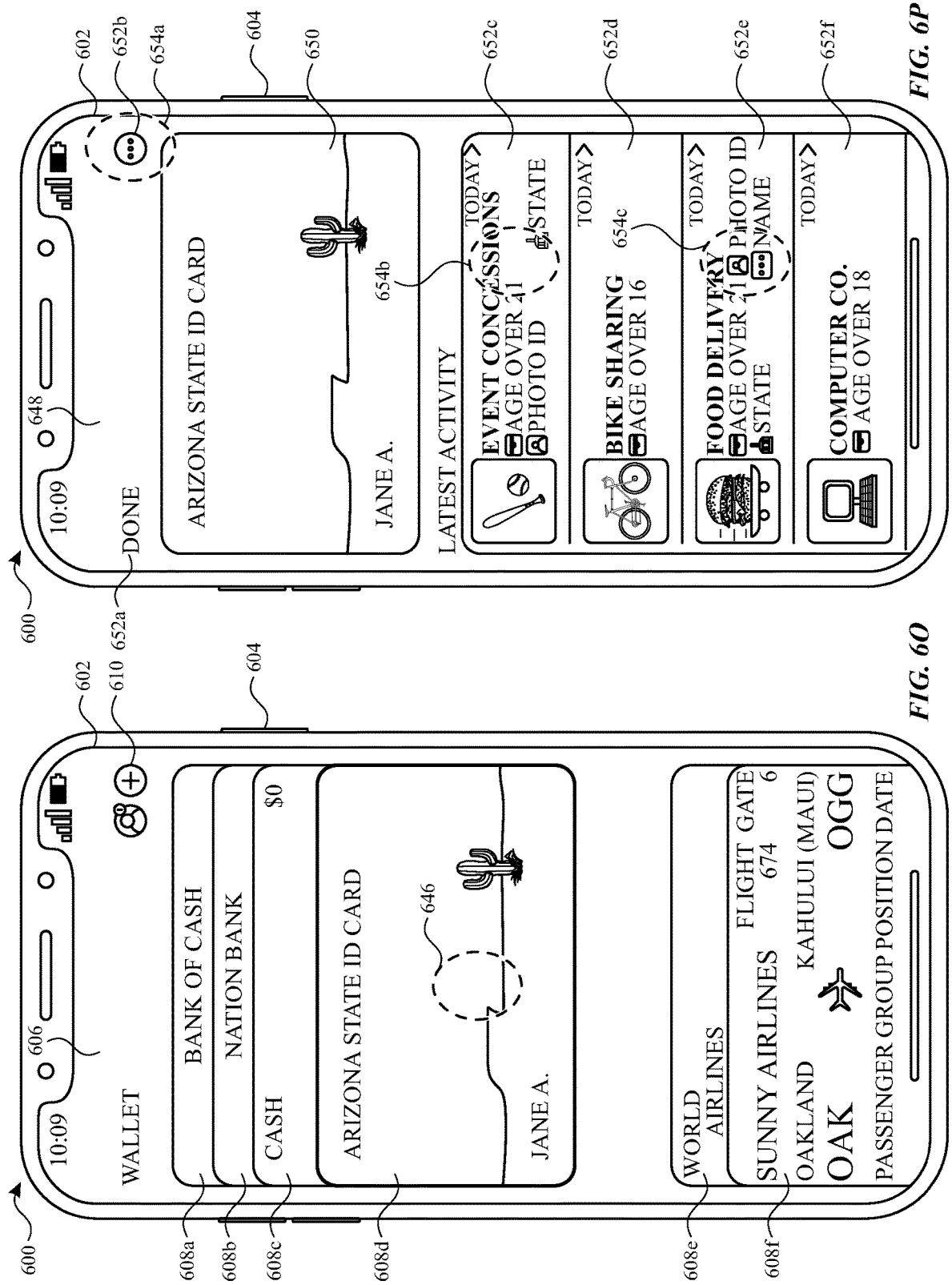

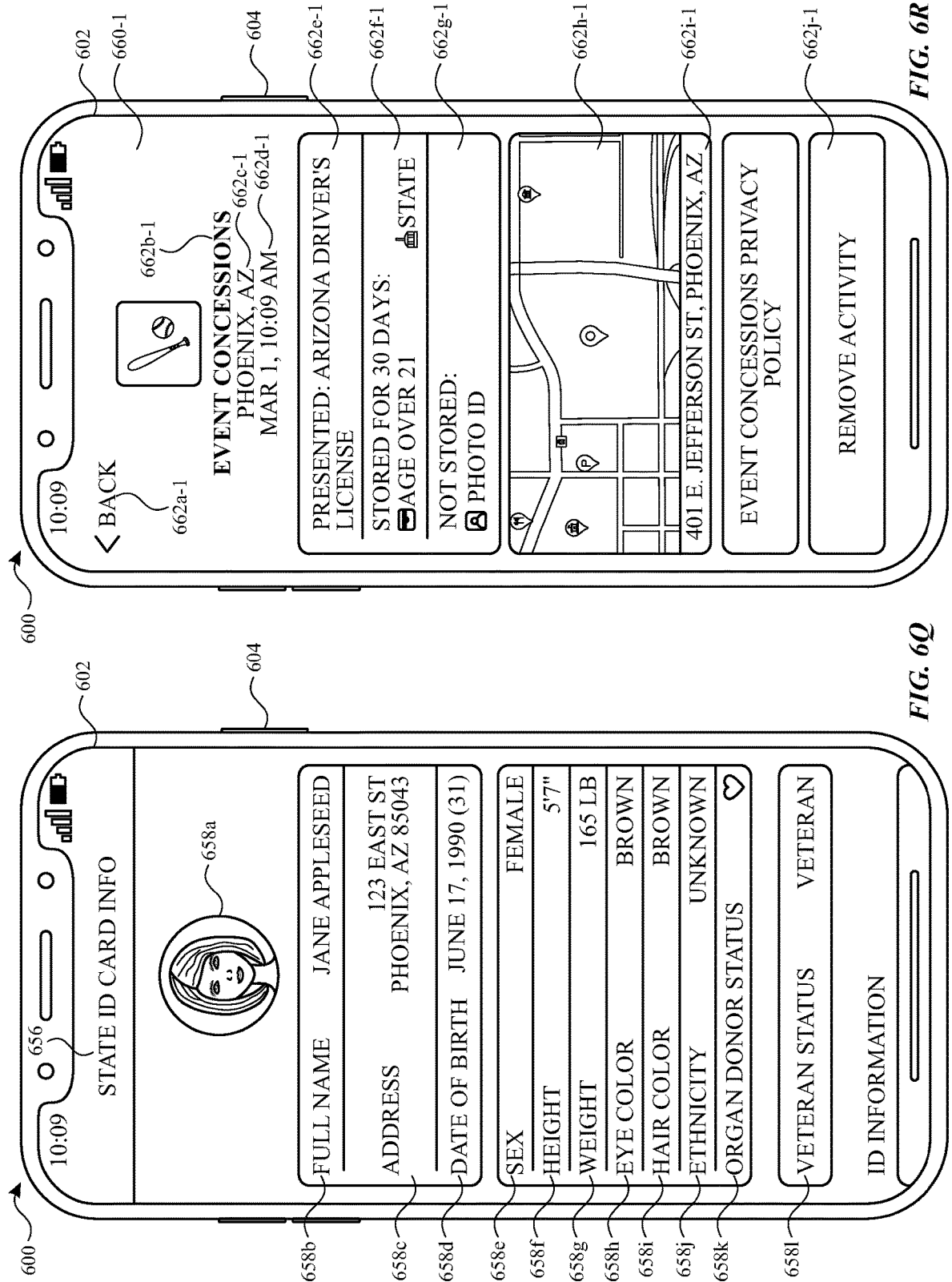

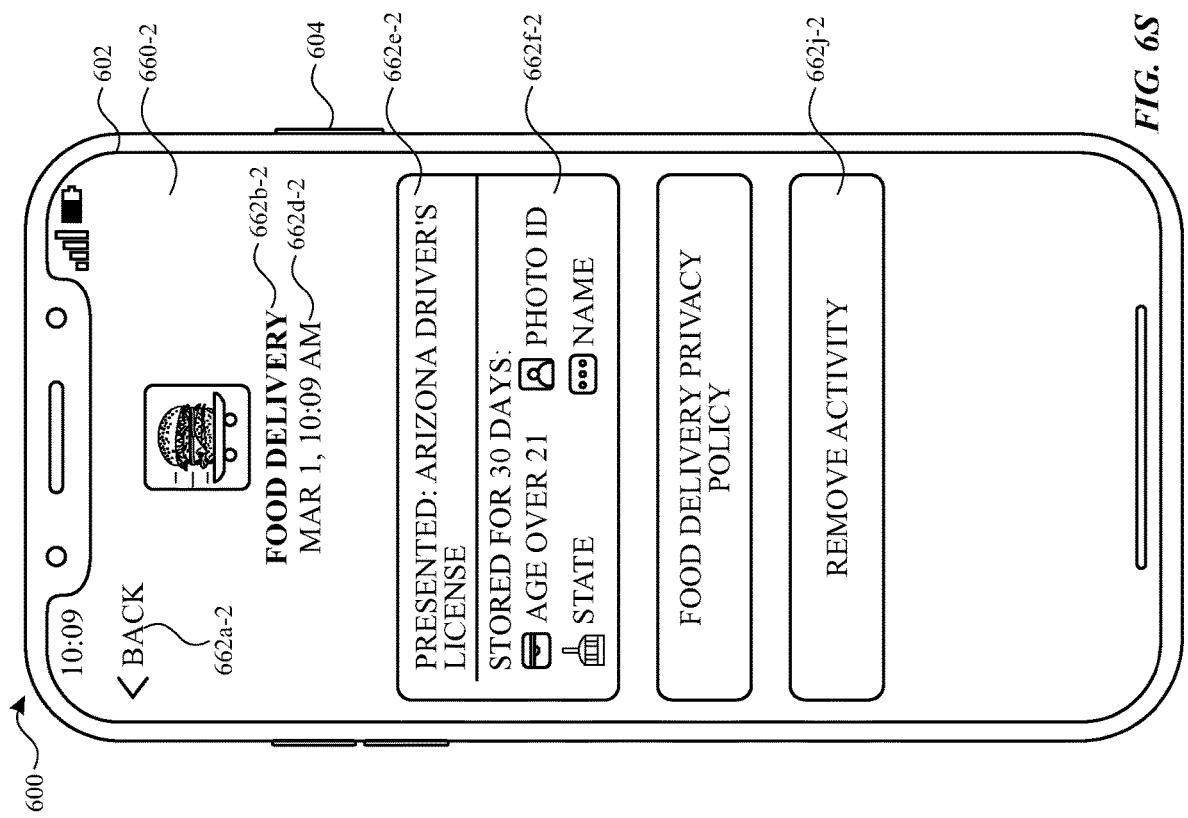

DIGITAL IDENTIFICATION CREDENTIAL USER INTERFACES

CROSS-REFERENCE TO RELATED APPLICATIONS

This application claims priority to U.S. Provisional Patent Application 63/349,071, entitled "DIGITAL IDENTIFICATION CREDENTIAL USER INTERFACES," filed Jun. 4, 2022, the contents of which is incorporated herein by reference in its entirety.

FIELD

The present disclosure relates generally to computer user interfaces, and more specifically to techniques for managing and using digital credentials, including digital identification credentials.

BACKGROUND

As electronic devices such as smartphones have become more widely used, their functions have grown beyond phone calls and text messaging. Providing an efficient method for using and implementing the various functions on these electronic devices can be complex and time-consuming.

BRIEF SUMMARY

Some techniques for managing and using digital credentials using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing and using digital credentials. Such methods and interfaces optionally complement or replace other methods for managing and using digital credentials. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: displaying, via the display generation component, a first user interface corresponding to a first application; receiving, from the first application, a request for digital identification of a user; in response to receiving, from the first application, the request for digital identification of a user: displaying, via the display generation component, a second user interface corresponding to a second application different from the first application, wherein the second application has access to a first set of digital identification information corresponding to the user; while displaying the second user interface, receiving, via the one or more input devices, a first set of user inputs; and in response to receiving the first set of user inputs: in accordance with a determination that the first set of user inputs satisfies authorization criteria, providing, to the first application, a first subset of the first set of digital identification information corresponding to the user.

In accordance with some embodiments, a non-transitory computer-readable storage medium is described. The non-transitory computer-readable storage medium stores one or more programs configured to be executed by one or more processors of a computer system that is in communication with a display generation component and one or more input devices, and the one or more programs include instructions for: displaying, via the display generation component, a first user interface corresponding to a first application; receiving, from the first application, a request for digital identification of a user; in response to receiving, from the first application, the request for digital identification of a user: displaying, via the display generation component, a second user interface corresponding to a second application different from the first application, wherein the second application has access to a first set of digital identification information corresponding to the user; while displaying the second user interface, receiving, via the one or more input devices, a first set of user inputs; and in response to receiving the first set of user inputs: in accordance with a determination that the first set of user inputs satisfies authorization criteria, providing, to the first application, a first subset of the first set of digital identification information corresponding to the user.

In accordance with some embodiments, a transitory computer-readable storage medium is described. The transitory computer-readable storage medium stores one or more programs configured to be executed by one or more processors of a computer system that is in communication with a display generation component and one or more input devices, and the one or more programs include instructions for: displaying, via the display generation component, a first user interface corresponding to a first application; receiving, from the first application, a request for digital identification of a user; in response to receiving, from the first application, the request for digital identification of a user: displaying, via the display generation component, a second user interface corresponding to a second application different from the first application, wherein the second application has access to a first set of digital identification information corresponding to the user; while displaying the second user interface, receiving, via the one or more input devices, a first set of user inputs; and in response to receiving the first set of user inputs: in accordance with a determination that the first set of user inputs satisfies authorization criteria, providing, to the first application, a first subset of the first set of digital identification information corresponding to the user.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: displaying, via the display generation component, a first user interface corresponding to a first application; receiving, from the first application, a request for digital identification of a user; in response to receiving, from the first application, the request for digital identification of a user: displaying, via the display generation component, a second user interface corresponding to a second application different from the first application, wherein the second application has access to a first set of digital identification information corresponding to the user; while displaying the second user interface, receiving, via the one or more input devices, a first set of user inputs; and in response to receiving the first set of user inputs: in accordance with a determination that the first set of user inputs satisfies authorization criteria, providing, to the first application, a first subset of the first set of digital identification information corresponding to the user.

In accordance with some embodiments, a computer system is described. The computer system is configured to communicate with a display generation component and one or more input devices, and comprises: means for displaying, via the display generation component, a first user interface corresponding to a first application; means for receiving, from the first application, a request for digital identification of a user; means for, in response to receiving, from the first application, the request for digital identification of a user: displaying, via the display generation component, a second user interface corresponding to a second application different from the first application, wherein the second application has access to a first set of digital identification information corresponding to the user; means for, while displaying the second user interface, receiving, via the one or more input devices, a first set of user inputs; and means for in response to receiving the first set of user inputs: in accordance with a determination that the first set of user inputs satisfies authorization criteria, providing, to the first application, a first subset of the first set of digital identification information corresponding to the user.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a first user interface corresponding to a first application; receiving, from the first application, a request for digital identification of a user; in response to receiving, from the first application, the request for digital identification of a user: displaying, via the display generation component, a second user interface corresponding to a second application different from the first application, wherein the second application has access to a first set of digital identification information corresponding to the user; while displaying the second user interface, receiving, via the one or more input devices, a first set of user inputs; and in response to receiving the first set of user inputs: in accordance with a determination that the first set of user inputs satisfies authorization criteria, providing, to the first application, a first subset of the first set of digital identification information corresponding to the user.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing and using digital credentials, thereby increasing the effectiveness, efficiency, and user satisfaction with such devices. Such methods and interfaces may complement or replace other methods for managing and using digital credentials.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing and using digital credentials. For example, there is a need for techniques that provide a secure way to use and manage digital credentials while minimizing unnecessary manual effort by a user to manage and use digital credentials. Such techniques can reduce the cognitive burden on a user who use digital credentials, thereby enhancing productivity. Further, such techniques can reduce processor and battery power otherwise wasted on redundant user inputs.

Figure 6H:
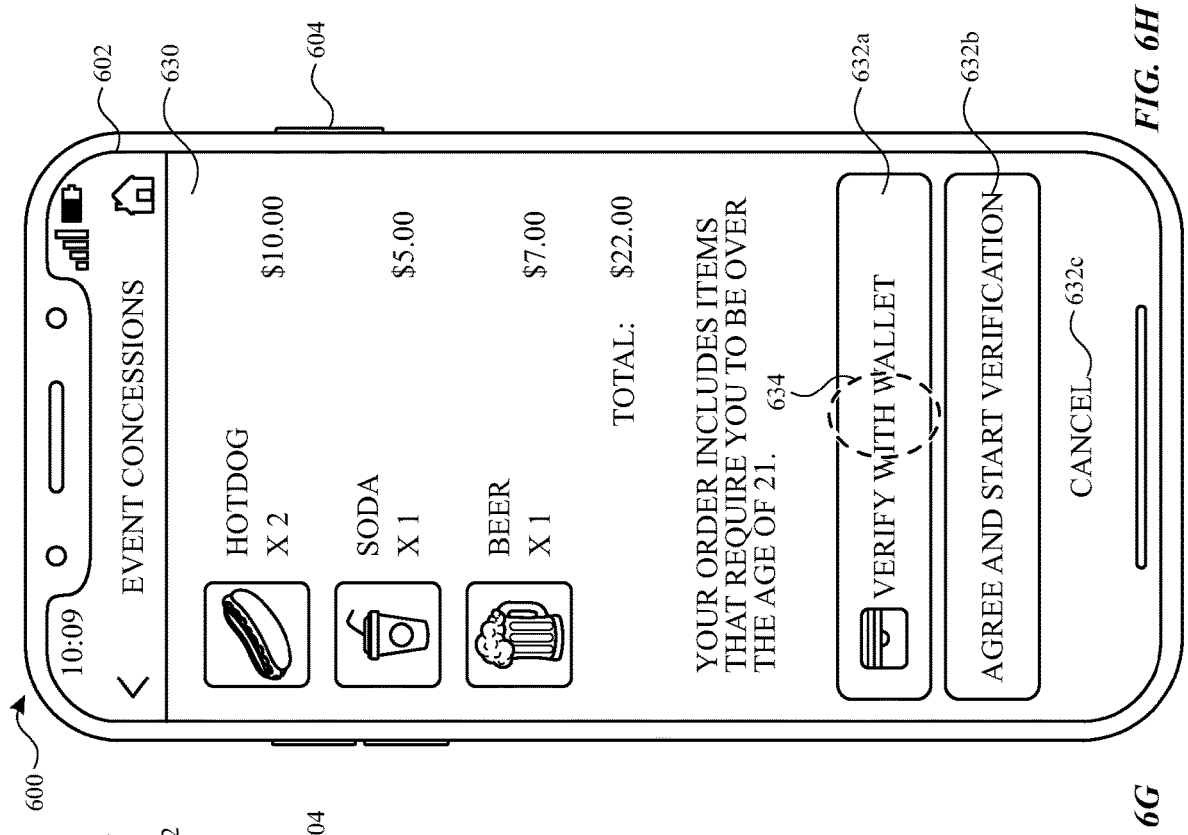
FIGS. 6A-6S illustrate exemplary user interfaces for using and managing digital identification credentials in accordance with some embodiments.
Figure 7:
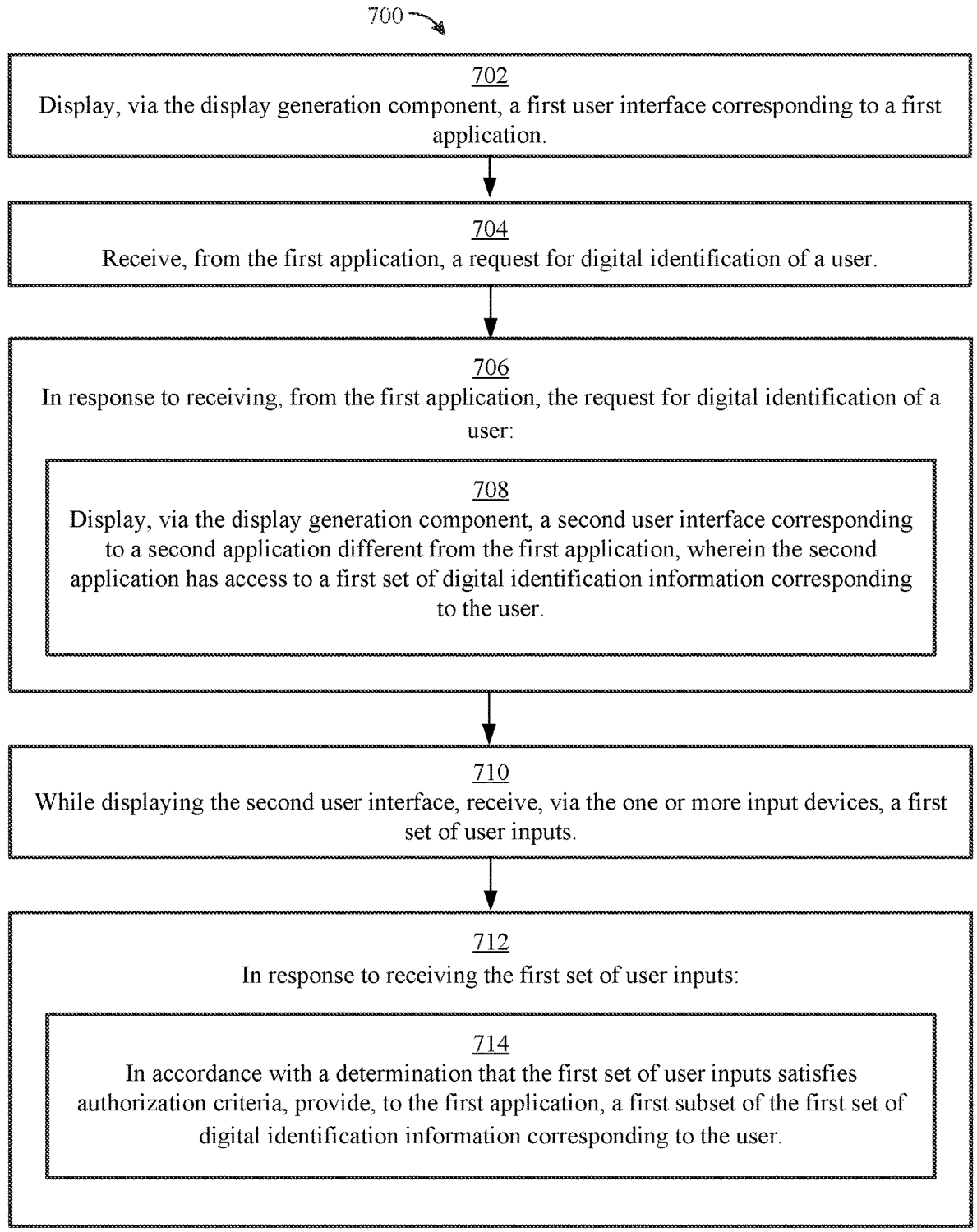
FIG. 7 illustrates a flow diagram depicting a method for using digital identification credentials in accordance with some embodiments.

Below, FIGS. 1A-1B, 2, 3, 4A-4B, and 5A-5B provide a description of exemplary devices for performing the techniques for using and managing digital credentials. FIGS. 6A-6S illustrate exemplary user interfaces for using and managing digital identification credentials in accordance with some embodiments. FIG. 7 is a flow diagram illustrating methods of using digital identification credentials in accordance with some embodiments. The user interfaces in FIGS. 6A-6S are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
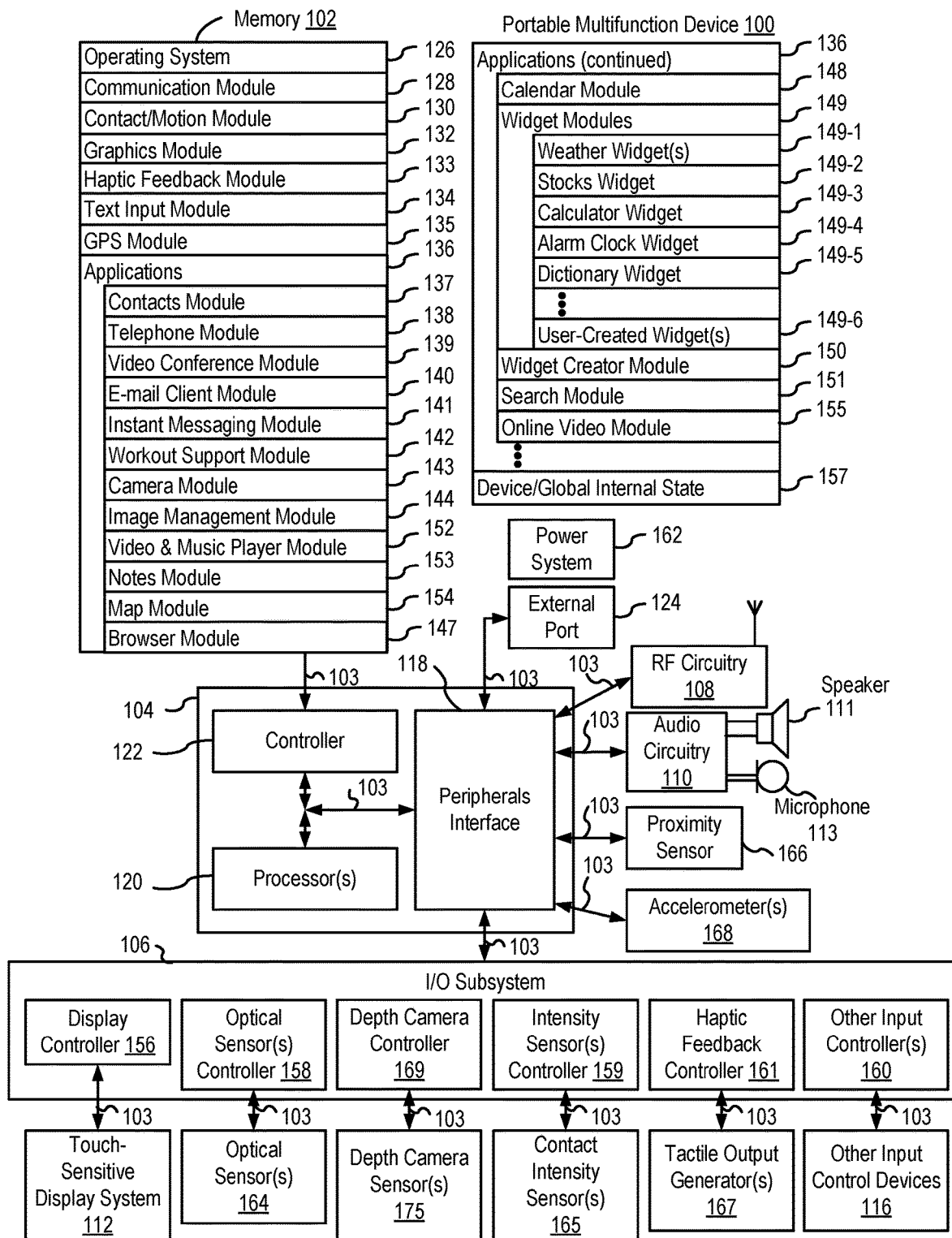
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
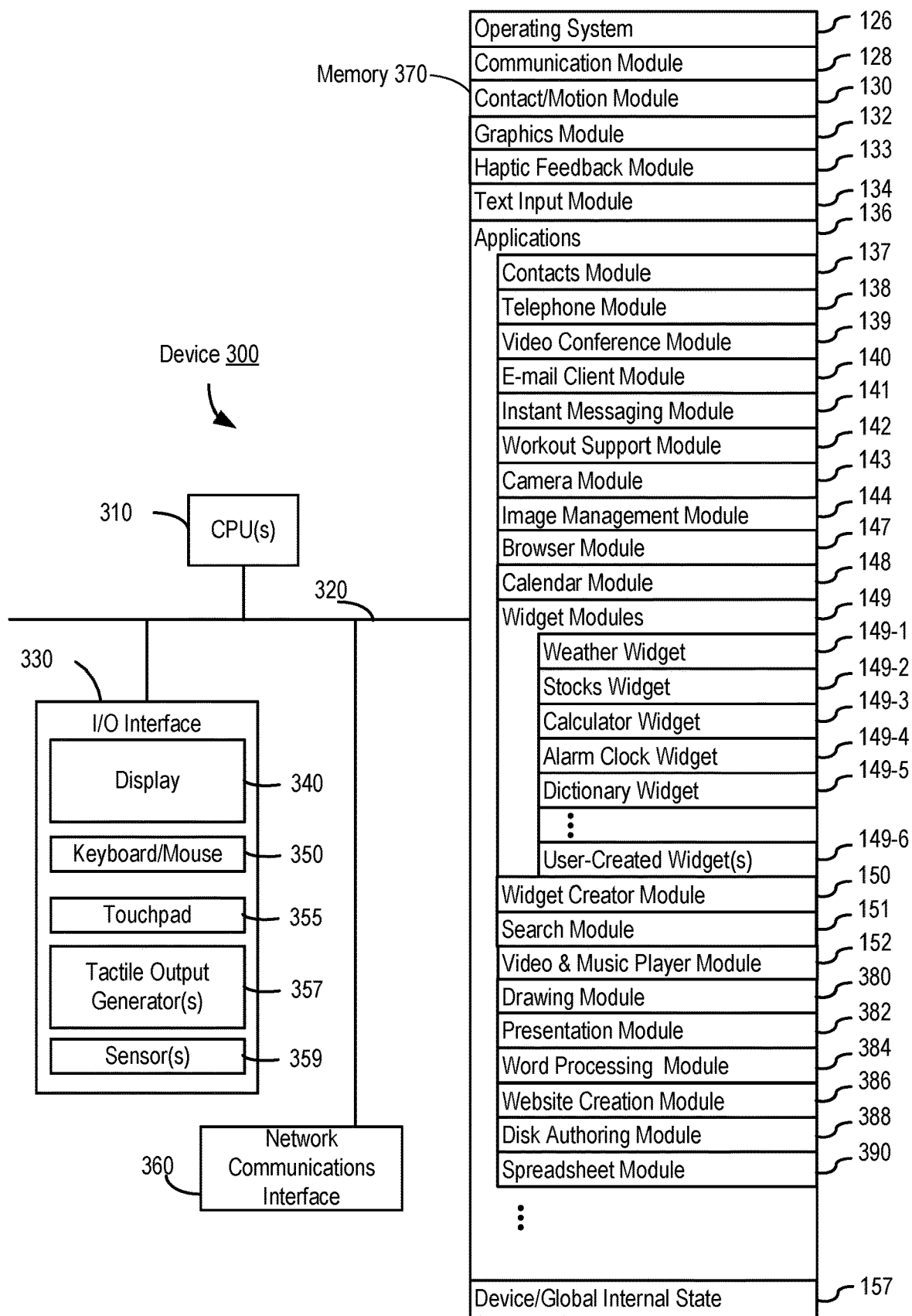
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional patent application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
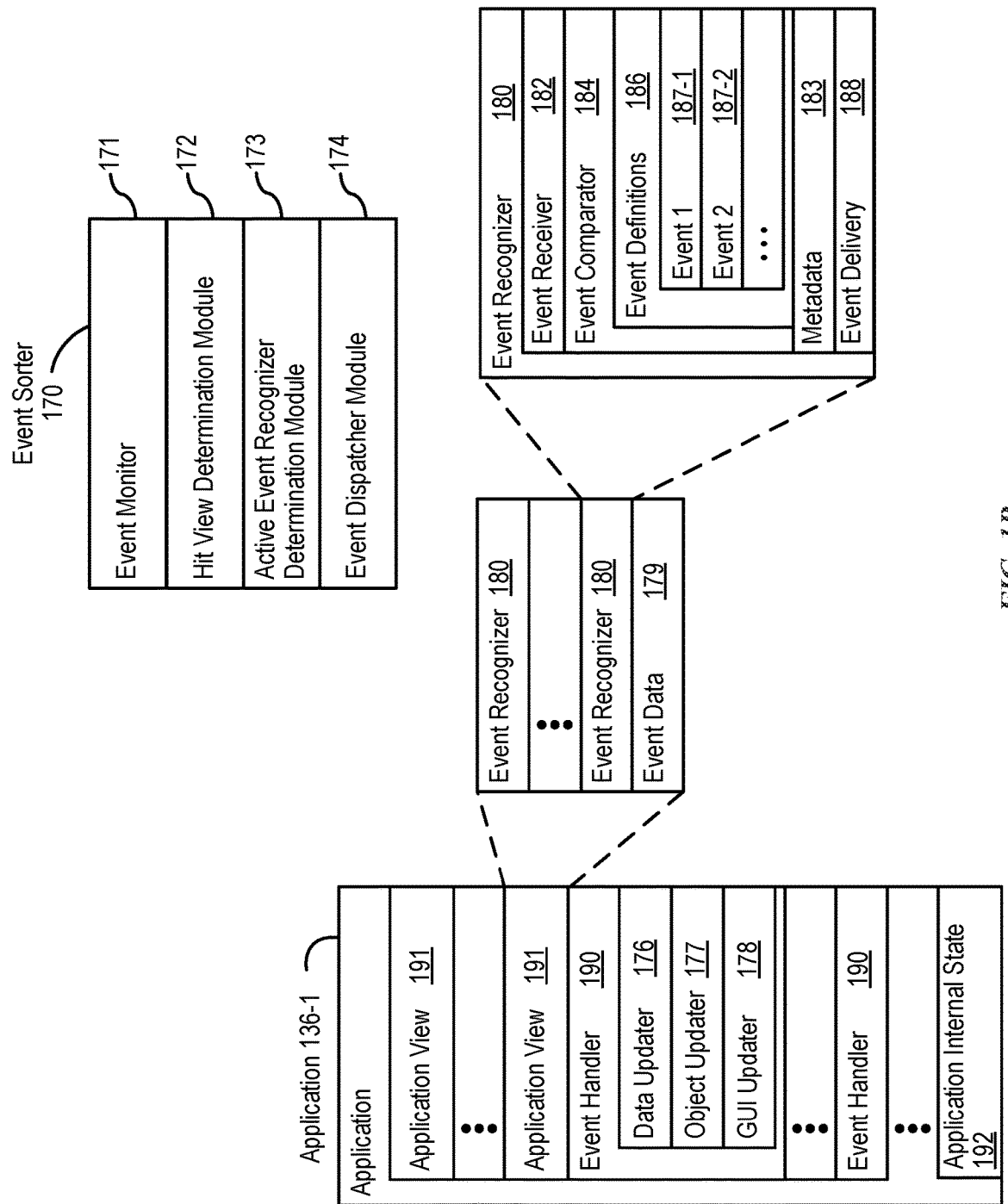
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
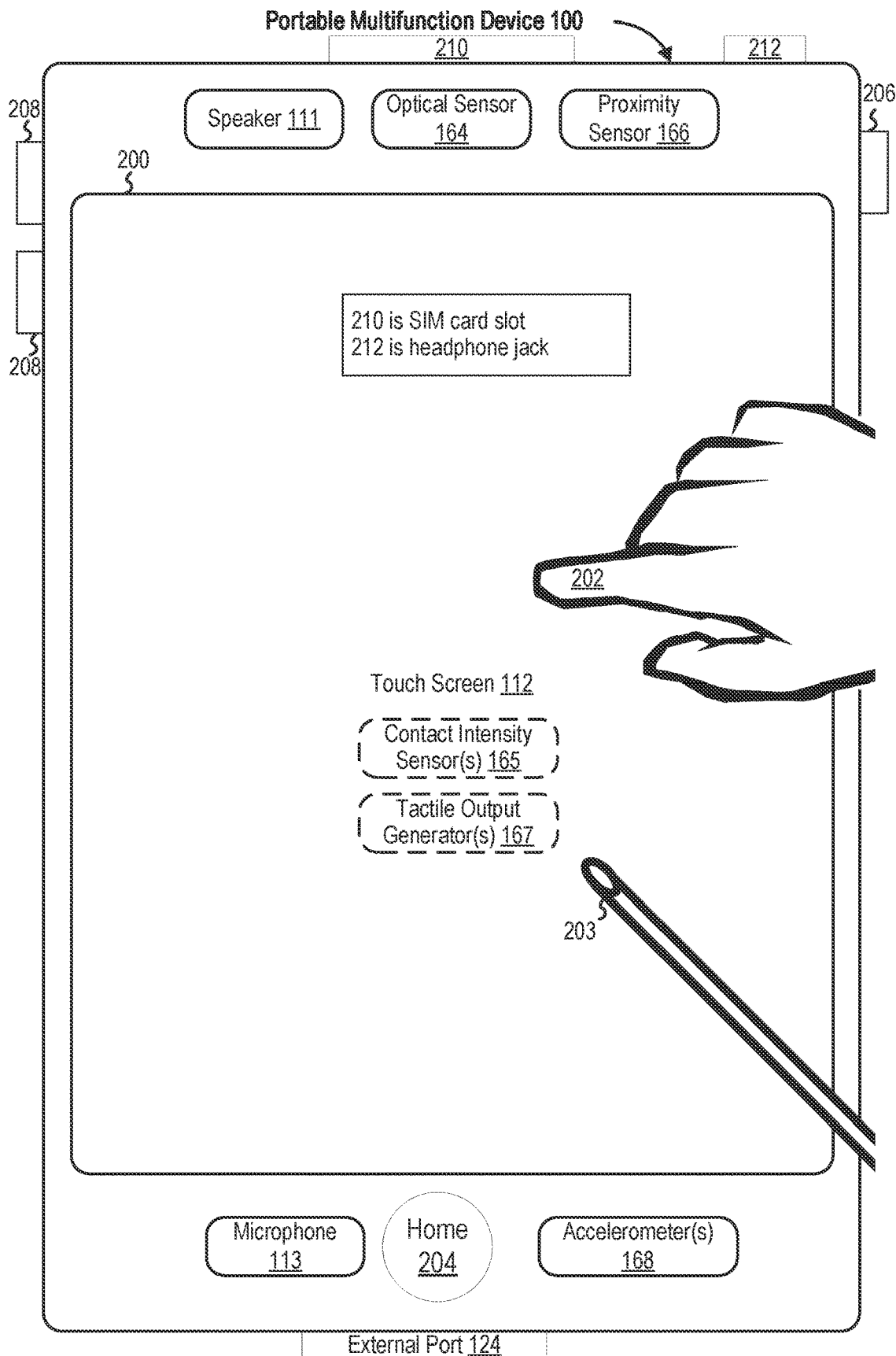
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
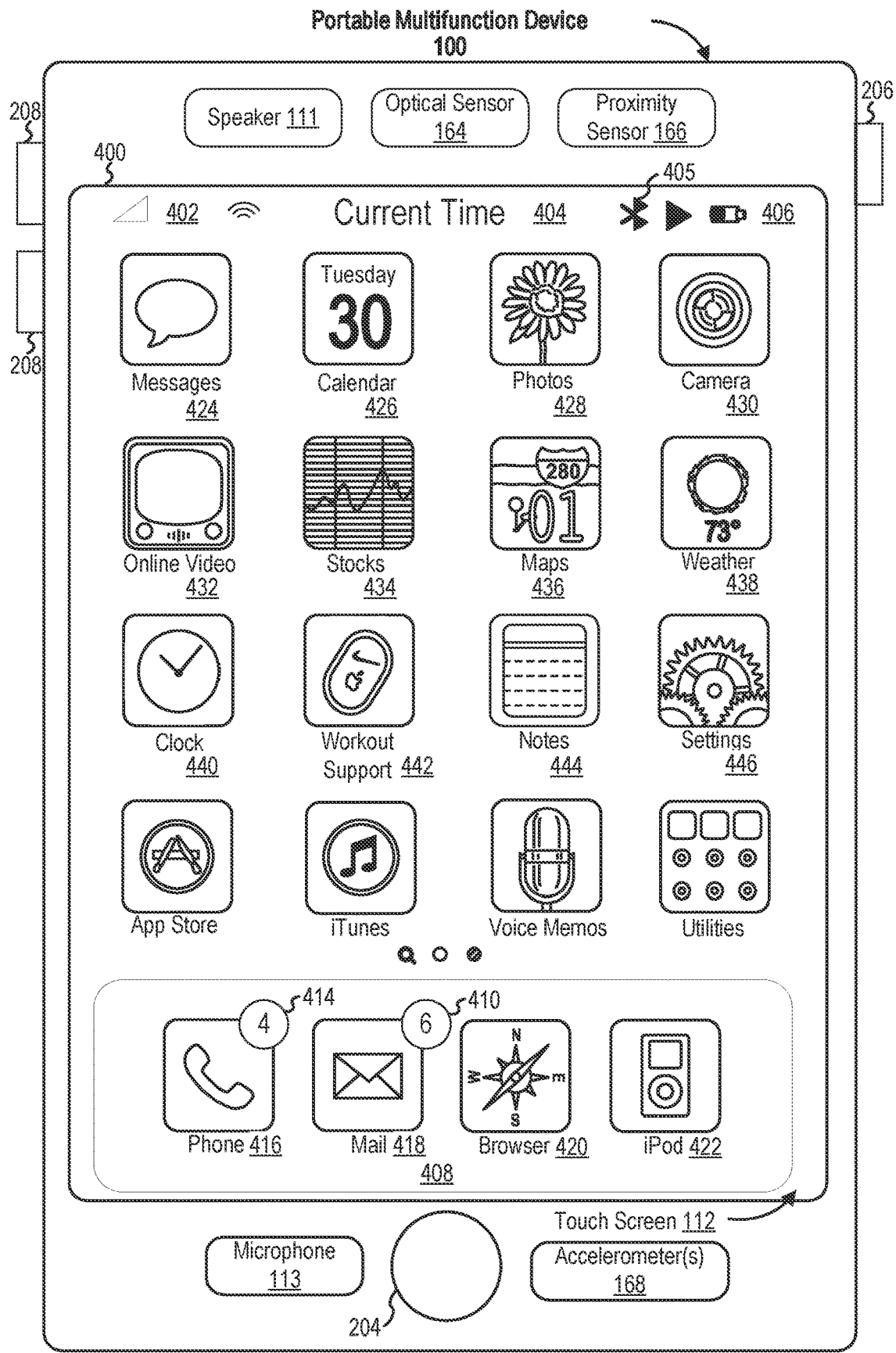
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and
Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
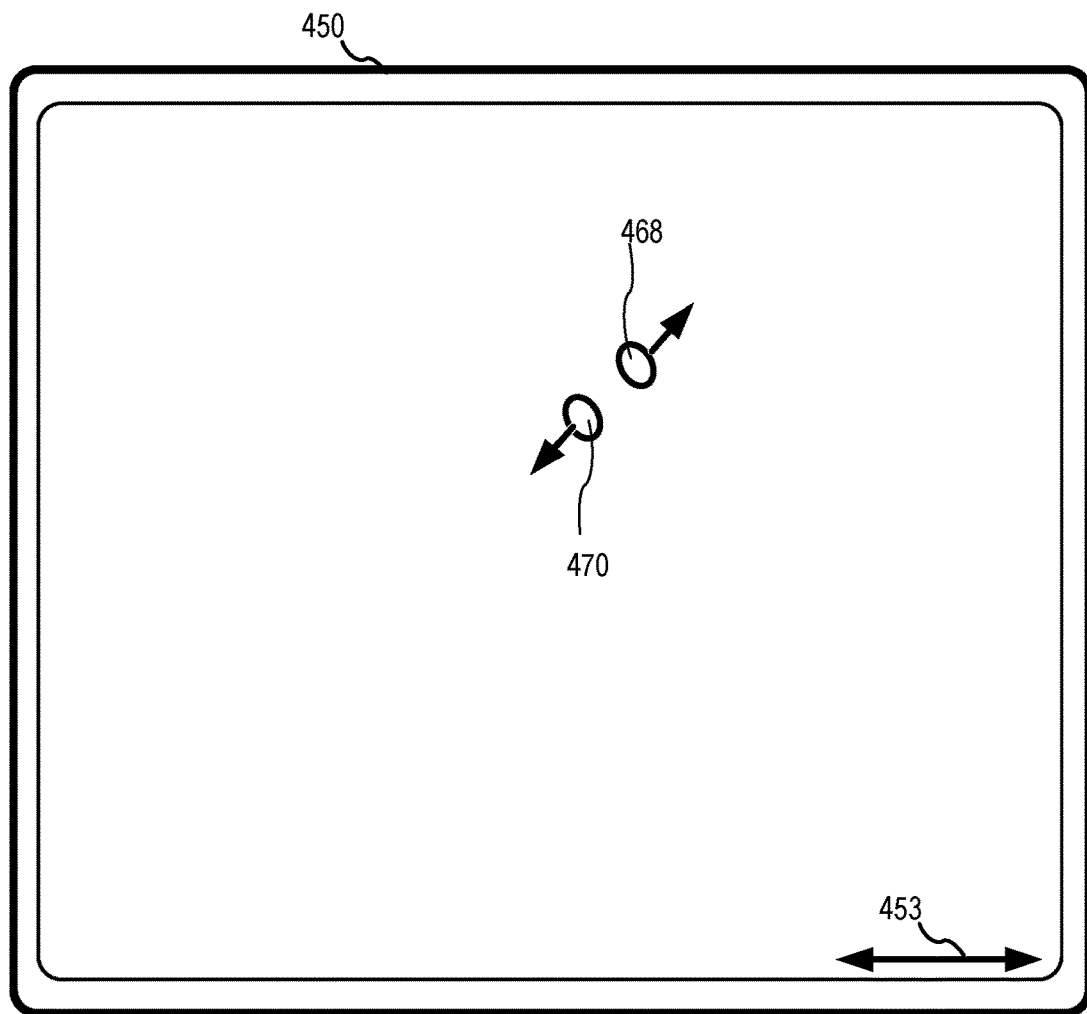
FIG. 4B illustrates an exemplary user interface for a multifunction device with a touch-sensitive surface that is separate from the display in accordance with some embodiments.
Figure 4B:
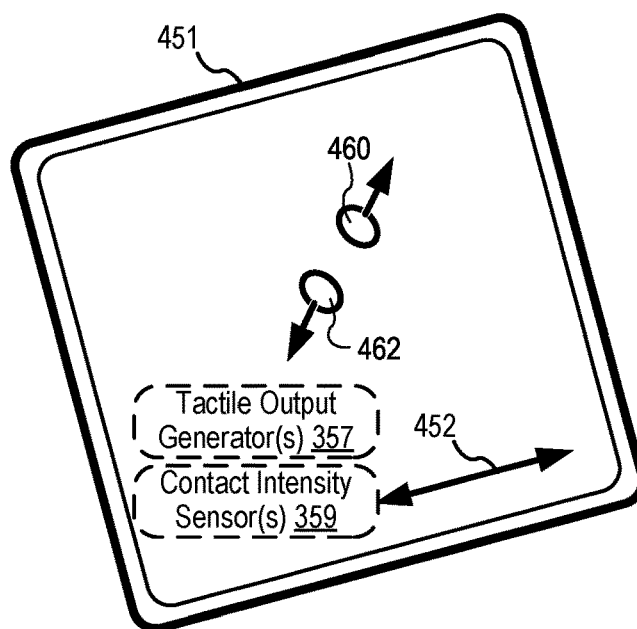

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
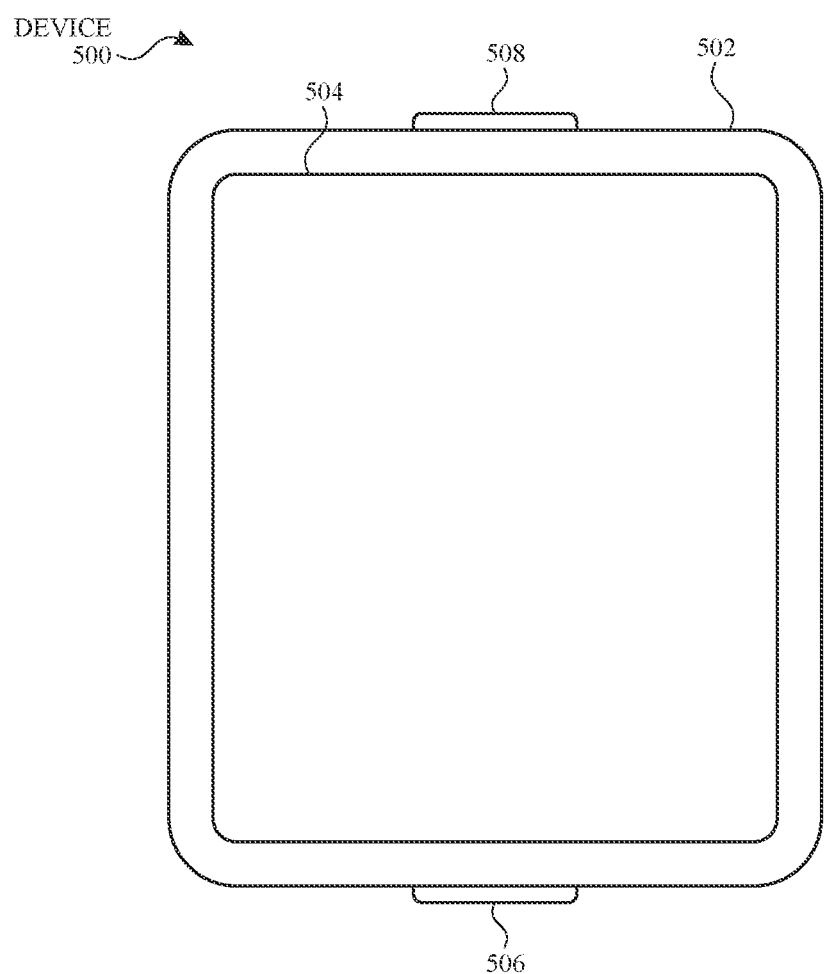
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
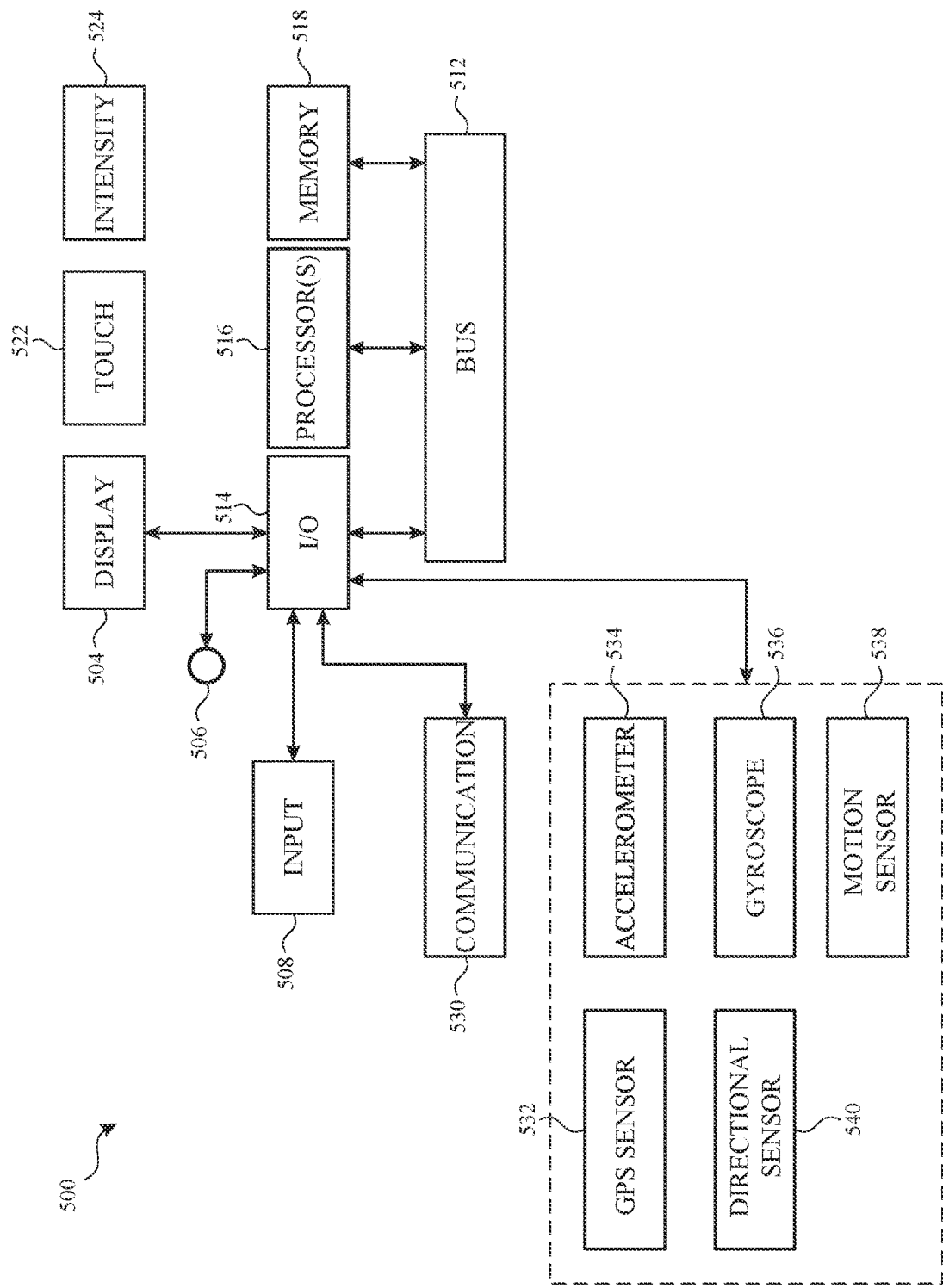
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for using and managing digital identification credentials, in accordance with some embodiments. The user interfaces in these figures are used to illustrate the processes described below, including the processes in FIG. 7.

FIG. 6A depicts electronic device 600, which is a smartphone with touch-sensitive display 602 and button 604. In some embodiments, electronic device 600 includes one or more features of devices 100, 300, and/or 500. Electronic device 600 depicts wallet user interface 606. Wallet user interface 606 includes representations of digital credentials 608a-608f that are stored on electronic device 600 (e.g., in a secure element of electronic device 600). Digital credential representations 608a-608f include digital payment credential representations 608a-608c (e.g., digital credentials that can be used to make payments for goods and services), and digital access credential representations 608e-608f (e.g., digital credentials that can be used for a user to gain access to goods and services, such as airline flights, events, and the like). Digital credential representations 608a-608f also include digital identification credential representation 608d representative of a first digital identification credential (e.g., an Arizona state ID card). Digital identification credential representation 608d is associated with identification information pertaining to an individual and/or a user, and, in some embodiments, can be used to verify the identification information pertaining to the user (e.g., name, age, gender, address, and/or state of residence). In some embodiments, digital identification credential representation 608d does not represent a payment credential (e.g., is not a credit card credential, a debit card credential, and/or a gift card credential). Wallet user interface 606 also includes option 610 that is selectable to initiate a process for adding a new digital credential to electronic device 600 (e.g., for enrolling a new digital credential and/or storing a new digital credential on electronic device 600).

In FIG. 6B, electronic device 600 depicts food delivery user interface 612 that corresponds to (e.g., is generated by and/or displayed by) a food delivery application. Food delivery user interface 612 identifies one or more items that a user of electronic device 600 is attempting to purchase. Electronic device 600 and/or the food delivery application determines that there are one or more items in the user's order that require the user to be over the age of 21 and, consequently, require verification of the user's age. Accordingly, food delivery user interface 612 includes option 614a that is selectable to verify the user's age using a wallet application (e.g., a wallet application that is separate from the food delivery application) that has access to one or more digital identification credentials stored on electronic device 600. In some embodiments, the wallet application has access to one or more digital identification credentials stored on electronic device 600 while the food delivery application does not have access to the one or more digital identification credentials stored on electronic device 600. Food delivery user interface 612 also includes option 614b that is selectable to verify the user's age using a different methodology (e.g., without using and/or invoking the wallet application and/or without using the one or more digital identification credentials stored on electronic device 600). For example, in some embodiments, option 614b is selectable to initiate a process for verifying the user's age based on a methodology provided by the food delivery application without using the wallet application and/or the one or more digital identification credentials enrolled on electronic device 600. Food delivery user interface 612 also includes option 614c that is selectable to cancel the food purchase transaction. At FIG. 6A, electronic device 600 detects user input 616 (e.g., a tap input) corresponding to selection of option 614a.

At FIG. 6C, in response to user input 616 (and/or in response to a request from the food delivery application), electronic device 600 displays user interface 618. In FIG. 6C, user interface 618 is overlaid on user interface 612. In some embodiments, in response to user input 616, user interface 612 is visually de-emphasized (e.g., displayed with less saturation, less brightness, and/or less sharpness and/or focus (e.g., blurred)) while user interface 618 is overlaid on user interface 612. In some embodiments, user interface 618 is generated by and/or displayed by the wallet application and/or an operating system of electronic device 600, and is not generated by and/or displayed by the food delivery application. User interface 618 includes entity information 620a that identifies an entity and/or an application (e.g., "Food Delivery" application) that is requesting digital identification credential information. User interface 618 also includes digital identification credential indication 620b that identifies the digital identification credential stored on electronic device 600 that is the source of the digital identification credential information to be provided to the food delivery application (which, in the depicted scenario, is an Arizona Driver's License stored on electronic device 600). User interface 618 further includes requested information indication 620c that identifies all digital identification credential information that is being requested by the food delivery application. In the depicted scenario, the food delivery application is requesting: (1) verification that the user is over 21 years of age; (2) a photo of the user associated with the digital identification credential; (3) a state associated with the digital identification credential; and the name of the user (e.g., as presented and/or stored on the digital identification credential). All of the requested information corresponds to, is part of, and/or is stored as part of the digital identification credential. In some embodiments, the request for verification that the user is over 21 is a request for the user's date of birth. In some embodiments, the request for verification that the user is over 21 is a request for a binary determination of whether or not the user is over 21 without providing the user's actual date of birth. Requested information indication 620c in user interface 618 also indicates that all of the requested digital identification credential information will be stored by the food delivery application for 30 days.

User interface 618 includes indication 620e instructing the user to press side button 604 if the user wishes to proceed with providing the requested digital identification credential information to the food delivery application. At FIG. 6C, electronic device 600 detects user input 622 (e.g., a button press input or a button double-press input) on side button 604.

At FIG. 6D, in response to user input 622, electronic device 600 collects biometric information from the user, as indicated by indication 620f. For example, in some embodiments, electronic device 600 collects facial scan information (e.g., via camera 621 and/or a depth sensor of electronic device 600). In some embodiments, biometric information includes fingerprint scan information and/or eye scan information. In some embodiments, the digital identification credential is bound to a specific biometric profile on electronic device 600 (e.g., a facial scan profile, a fingerprint scan profile, and/or an eye scan profile). Once biometric information is collected from the user, electronic device 600 determines whether the collected biometric information matches the specific biometric profile that is associated with the digital identification credential. In some embodiments, electronic device 600 stores a plurality of biometric profiles corresponding to a plurality of users and/or a plurality of appearances of the same user. For example, electronic device 600 stores a first biometric profile corresponding to a first user, and a second biometric profile corresponding to a second user. Both users are authorized to electronic device 600 and, as such, both the first and second biometric profile can be used to perform one or more functions, such as unlocked electronic device 600. However, if a first digital identification credential is bounded to the first biometric profile but not to the second biometric profile (e.g., the first digital identification credential corresponds to only the first user and does not correspond to the second user), then user biometric information corresponding to (e.g., matching) the first biometric profile will authorize transmission of digital identification credential information corresponding to the first digital identification credential, but user biometric information corresponding to (e.g., matching) the second biometric profile will not be able to authorize transmission of digital identification credential information corresponding to the first digital identification credential. In some embodiments, the first digital identification credential can only be bound to a single biometric profile of electronic device 600.

In FIG. 6E, electronic device 600 confirms that the biometric information collected from the user matches the biometric profile that corresponds to the digital identification credential and, in response, displays indication 620g. Furthermore, in accordance with the determination that the biometric information collected from the user matches the biometric profile that corresponds to the digital identification credential, the wallet application provides the requested digital identification credential information corresponding to the digital identification credential to the food delivery application.

In FIG. 6F, in response to the food delivery application receiving the requested digital identification credential information and confirming that the user is over 21, user interface 612 is displayed with options 624a and 624b that are selectable to complete payment for the food delivery order. In the depicted embodiment, option 624a is selectable to initiate a process for completing payment within the food delivery application, and option 624a is selectable to initiate a process for completing payment using the wallet application (e.g., using one or more digital payment credentials stored on electronic device 600 (e.g., digital payment credentials 608a-608c) that can be accessed by the wallet application but cannot be accessed by the food delivery application).

Figure 6G:
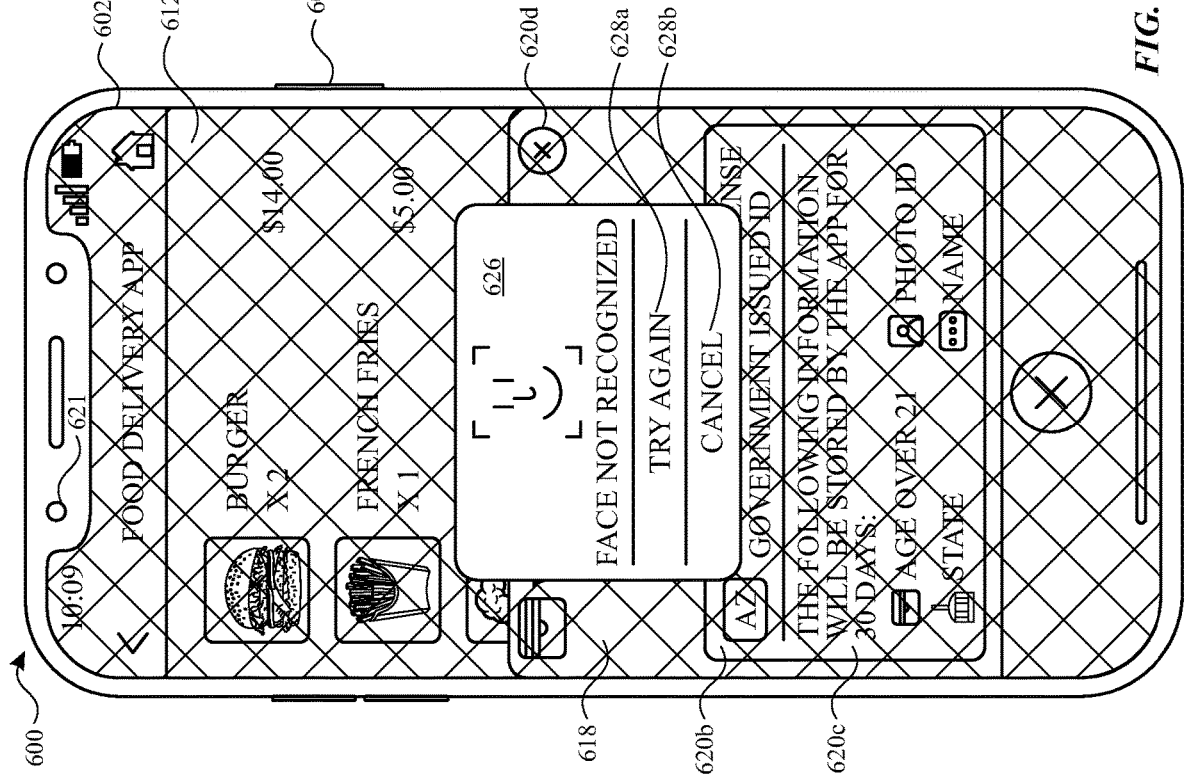

FIG. 6G displays an alternative scenario in which electronic device 600 determines that the biometric information collected from the user does not match the biometric profile that corresponds to the digital identification credential. In response to this determination, electronic device 600 displays user interface 626, which includes option 628a to re-attempt biometric authentication (e.g., option 628a is selectable to cause electronic device 600 to collect second biometric information from the user and compare the second biometric information to the biometric profile associated with the digital identification credential), and option 628b that is selectable to cancel and/or forego providing digital identification credential information to the food delivery application.

FIGS. 6H-6L depict a second example scenario involving an event concessions application. In FIG. 6H, electronic device 600 depicts event concessions user interface 630 that corresponds to (e.g., is generated by and/or displayed by) an event concessions application. Event concessions user interface 630 identifies one or more items that a user of electronic device 600 is attempting to purchase. Electronic device 600 and/or the event concessions application determines that there are one or more items in the user's order that require the user to be over the age of 21 and, consequently, require verification of the user's age. Accordingly, event concessions user interface 630 includes option 632a that is selectable to verify the user's age using the wallet application (e.g., a wallet application that is separate from the event concessions application). In some embodiments, the wallet application has access to one or more digital identification credentials stored on electronic device 600 while the event concessions application does not have access to the one or more digital identification credentials stored on electronic device 600. Event concessions user interface 630 also includes option 632b that is selectable to verify the user's age using a different methodology (e.g., without using and/or invoking the wallet application and/or without using the one or more digital identification credentials stored on electronic device 600). For example, in some embodiments, option 632b is selectable to initiate a process for verifying the user's age within the event concessions application without using the wallet application and/or the one or more digital identification credentials enrolled on electronic device 600. Event concessions user interface 630 also includes option 632c that is selectable to cancel the purchase transaction. At FIG. 6H, electronic device 600 detects user input 634 (e.g., a tap input) corresponding to selection of option 632a.

At FIG. 6I, in response to user input 634, electronic device 600 displays user interface 618 that is generated by and/or displayed by the wallet application, as discussed above with reference to FIGS. 6B-6G. In FIG. 6I, user interface 618 is overlaid on event concessions user interface 630. In some embodiments, in response to user input 634, user interface 630 is visually de-emphasized (e.g., displayed with less saturation, less brightness, and/or less sharpness and/or focus (e.g., blurred)) while user interface 618 is overlaid on user interface 630.

As discussed above, user interface 618 includes entity information 620a that identifies an entity and/or an application (e.g., "Event Concessions" application) that is requesting digital identification credential information. User interface 618 also includes digital identification credential indication 620b that identifies the digital identification credential stored on electronic device 600 that is the source of the digital identification credential information to be provided to the event concessions application (e.g., an Arizona Driver's License stored on electronic device 600). User interface 618 further includes requested information indication 620c that identifies all information that is being requested by the event concessions application. In the scenario depicted in FIG. 6I, the event concessions application is requesting: (1) verification that the user is over 21 years of age; and (2) a state associated with the digital identification credential (e.g., the state that issued the digital identification credential). All of the requested information corresponds to, is part of, and/or is stored as part of the digital identification credential. User interface 618 also indicates that this information will be stored by the event concessions application for 30 days. Furthermore, in FIG. 6I, user interface 618 also includes second requested information indication 620h that identifies digital identification credential information that is being requested by the event concessions application, but will not be stored by the event concessions application, which in FIG. 6I is an ID photograph. For example, if the user approves of transmission of digital identification credential information to the event concessions application, the wallet application will provide the event concessions application with confirmation that the user is over 21; a state associated with the user's digital identification credential; and a photo associated with the user's digital identification credential, and the event concessions application will store the first two pieces of information for 30 days but will not store the photo (e.g., will use the photo for less than a threshold duration of time to confirm the user's identity for this transaction but will not store the photo after confirmation of the user's identity).

User interface 618 includes indication 620e instructing the user to press (or double-press) side button 604 if the user wishes to proceed with providing the requested digital identification credential information to the event concessions application. At FIG. 6I, electronic device 600 detects user input 636 (e.g., a button press input or a button double-press input) on side button 604.

At FIG. 6J, in response to user input 636, electronic device 600 collects biometric information from the user, as indicated by indication 620f. In FIG. 6K, electronic device 600 confirms that the biometric information collected from the user matches the biometric profile that corresponds to the digital identification credential and, in response, displays indication 620g. Furthermore, in accordance with the determination that the biometric information collected from the user matches the biometric profile that corresponds to the digital identification credential, the wallet application provides the requested digital identification credential information corresponding to the digital identification credential to the event concessions application being executed on electronic device 600.

Figure 6L:
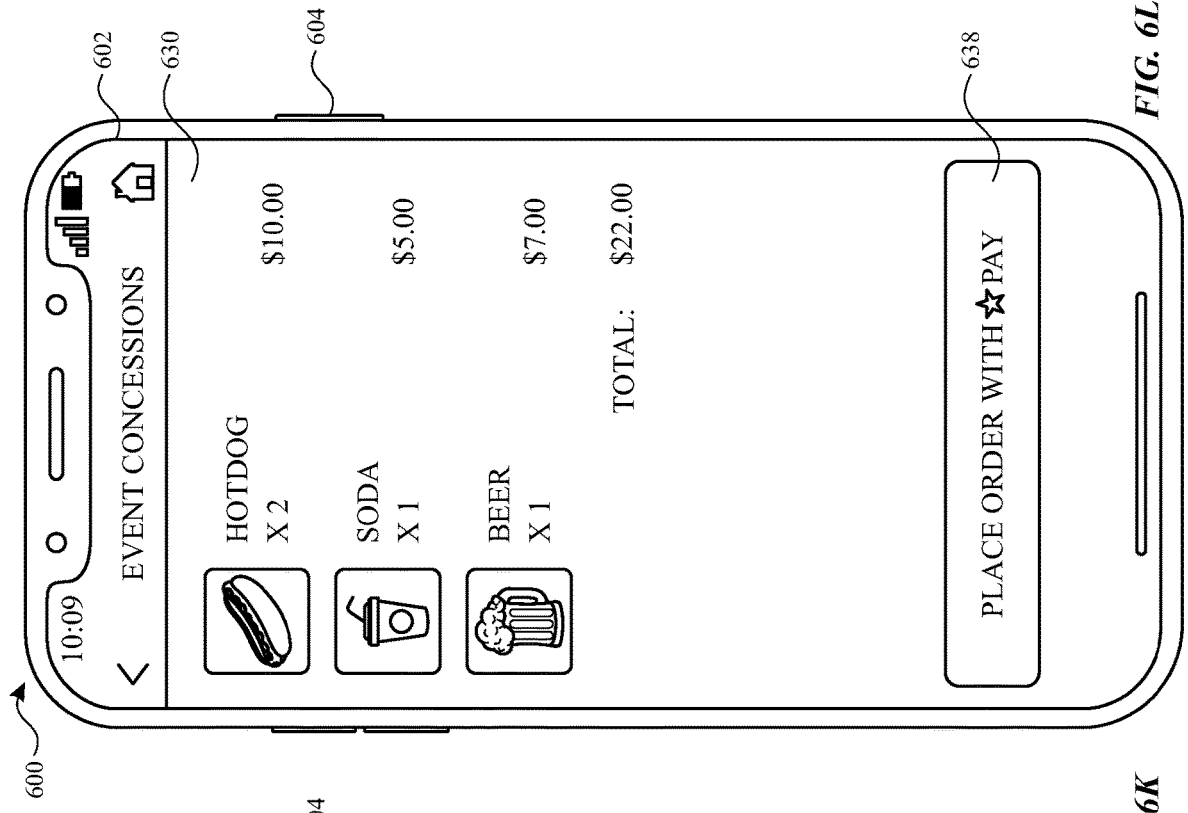
Figure 6K:
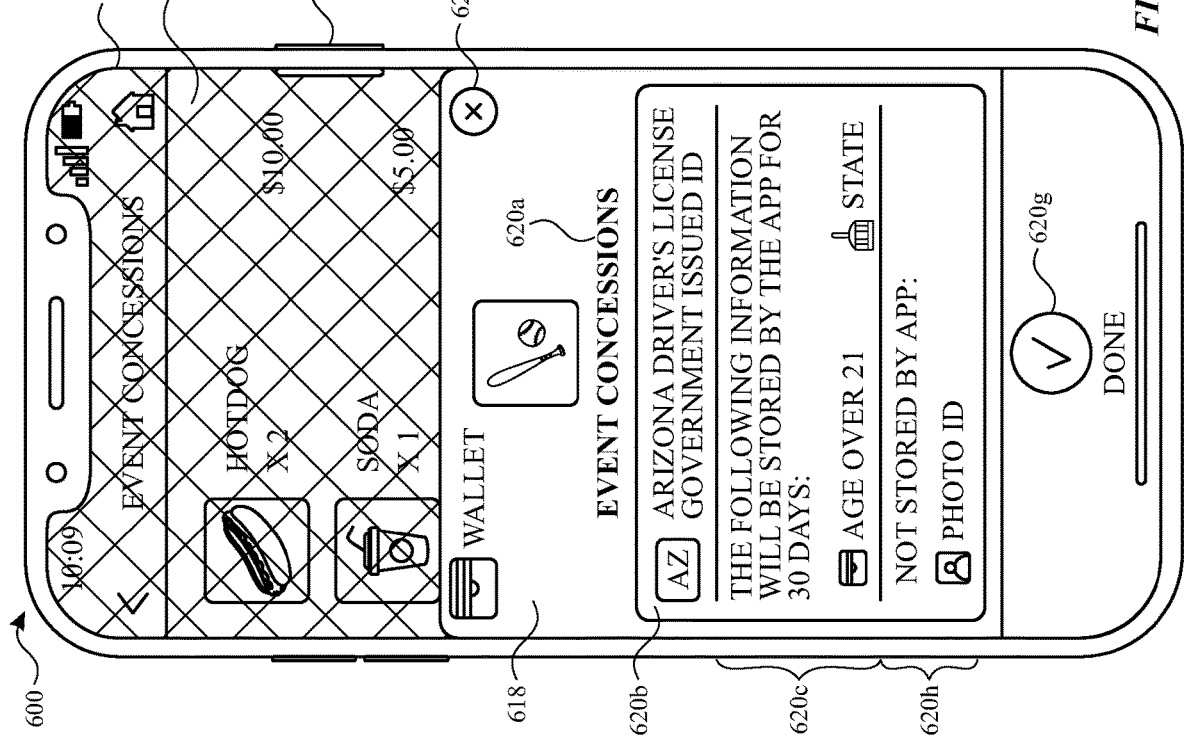

In FIG. 6L, in response to the event concessions application receiving the requested digital identification credential information and confirming that the user is over 21, user interface 630 is displayed with option 638 that is selectable to initiate a process for completing payment for the concessions order. In the depicted embodiment, option 638 is selectable to initiate a process for completing payment using the wallet application (e.g., using one or more digital payment credentials stored on electronic device 600 (e.g., digital payment credentials 608a-608c) that can be accessed by the wallet application but cannot be accessed by the event concessions application).

Figure 6N:
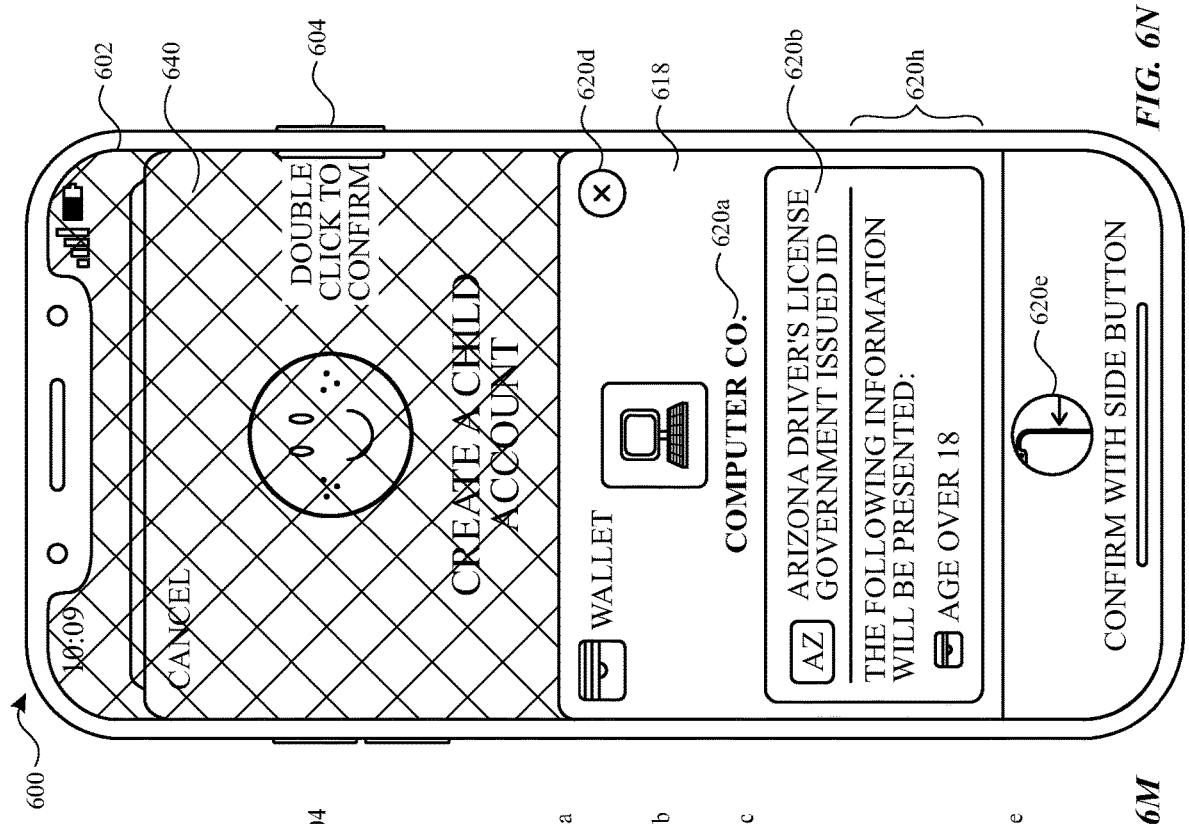
Figure 6M:
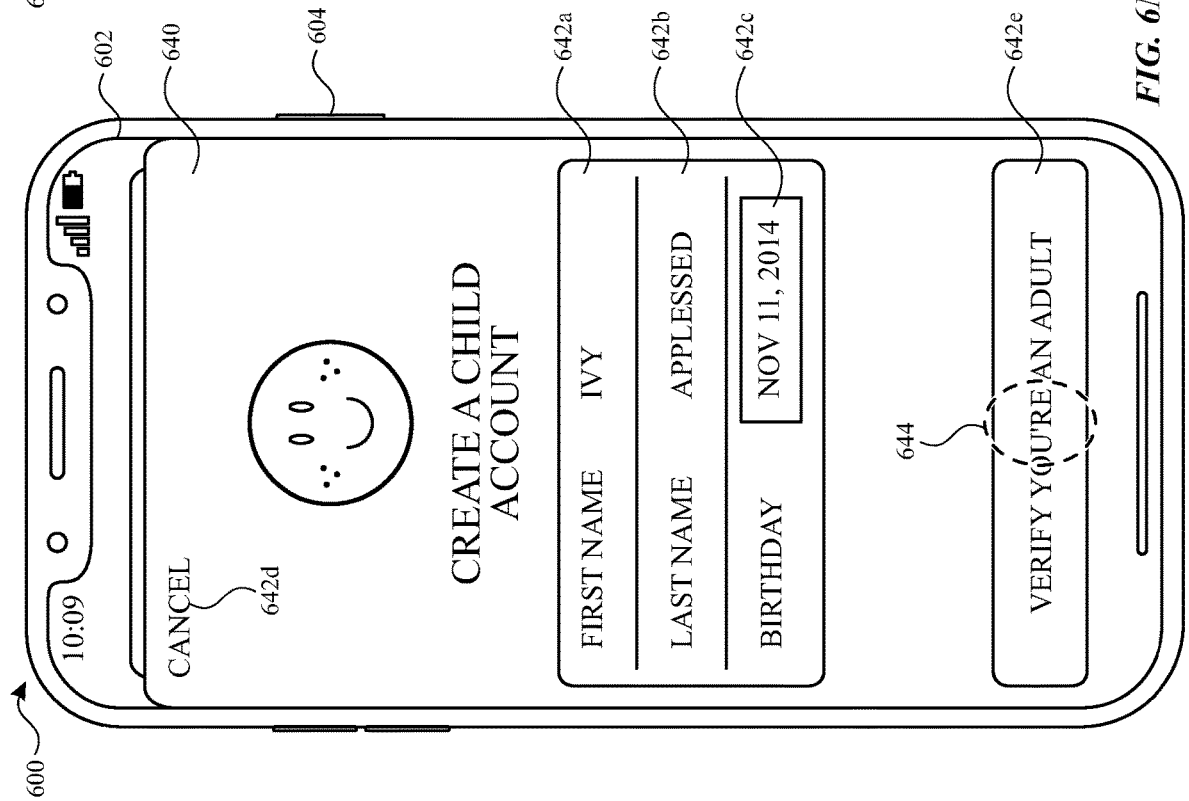

While FIGS. 6B-6L depicted two example scenarios in which a user used digital identification credential information associated with a digital identification credential to proceed with a payment transaction, FIG. 6M depicts a third scenario in which a user uses a digital identification credential to create an account for a child. In order to create an account for a child, the user must verify that the user is an adult (e.g., is over 18 years of age).

In FIG. 6M, electronic device 600 displays child account creation user interface 640 on display 602. In the depicted scenario, child account creation user interface 640 is associated with (e.g., generated by and/or displayed by) a first application that is separate from a wallet application (e.g., a wallet application that has access to one or more digital identification credentials stored on electronic device 600. Child account creation user interface 640 includes first name field 642a, last name field 642b, and birthdate field 642c. In some embodiments, first name field 642a, last name field 642b, and birthdate field 642c are initially displayed as incomplete, and device 600 receives a set of one or more inputs (e.g., tap inputs) corresponding to selection of each field to present a keyboard and/or date selection affordance for completing each field. Child account creation user interface 640 further includes option 642*d*, that is selectable to cancel creation of the child account, and option 642*e* that is selectable to initiate a process for verifying the user's age using one or more digital identification credentials stored on electronic device 600. At FIG. 6M, electronic device 600 detects user input 644 (e.g., a tap input) corresponding to selection of option 642*e*.

At FIG. 6N, in response to user input 644, electronic device 600 displays user interface 618, as was described above with reference to FIGS. 6B-6L. In FIG. 6N, user interface 618 identifies "Computer Co." as the entity and/or application requesting digital identification credential information as indicated by 620*a* of FIG. 6N, and includes requested information indication 620*h* indicating that Computer Co. is requesting confirmation that the user is over 18, and indicates that this information will not be stored by Computer Co. after verification of the user's age.

FIGS. 6O-6S illustrate example user interfaces for managing a digital identification credential. In FIG. 6O, electronic device 600 displays wallet user interface 600, as was described above with reference to FIG. 6A. In FIG. 6O, electronic device detects user input 646 (e.g., a tap input) corresponding to selection of representation 608*d*, which is a representation of a first digital identification credential (e.g., an Arizona driver's license/state ID).

At FIG. 6P, in response to user input 646, electronic device 600 displays digital credential details user interface 648 that corresponds to representation 608*d* and the first digital identification credential. Digital credential details user interface 648 includes image 650 that is a representation of the first digital identification credential. Digital credential details user interface 648 also includes option 652*b* that is selectable to view digital identification credential information (e.g., all digital identification credential information and/or a subset of the digital identification credential information) associated with the first digital identification credential (e.g., the Arizona driver's license), as will be described in greater detail below with reference to FIG. 6Q. Digital credential details user interface 648 also includes representations 652*c*-652*f* that are representative of digital identification credential information transmission instances in which the user previously approved transmission of digital identification credential information to an application. For example, representation 652*c* corresponds to an instance in which digital identification credential information was transmitted to an event concessions application, and identifies the specific digital identification credential information that was transmitted (e.g., by the wallet application) to the event concessions application in the transmission instance (e.g., verification that the user is over 21, photo ID, and state). Similarly, representation 652*e* corresponds to an instance in which digital identification credential information was transmitted to a food delivery application, and identifies the specific digital identification credential information that was transmitted (e.g., by the wallet application) the food delivery application (e.g., verification that the user is over 21, photo ID, state, and name). At FIG. 6P, electronic device 600 detects user input 654*a* (e.g. a tap input) corresponding to selection of option 652*b*, user input 654*b* (e.g., a tap input) corresponding to selection of transmission instance representation 652*c*, and user input 654*c* (e.g., a tap input) corresponding to selection of transmission instance representation 652*e*.

At FIG. 6Q, in response to user input 654*a*, electronic device 600 displays digital identification credential user interface 656. In the depicted scenario, digital identification credential user interface 656 presents digital identification credential information (e.g., all digital identification credential information) corresponding to a digital identification credential (e.g., ID photo 658*a*, full name 658*b*, address 658*c*, date of birth 658*d*, sex 658*e*, height 658*f*, weight 658*g*, eye color 658*h*, hair color 658*i*, ethnicity 658*j*, organ donor status 658*k*, and/or veteran state 658*l*). Digital identification credential user interface 656 indicates that the food delivery application in FIGS. 6B-6G, the event concessions application 6H-6L, and Computer Co. in FIGS. 6M-6N requested only a small subset of the digital identification credential information associated with the first digital identification credential. Accordingly, in each of those scenarios, the wallet application provided the requesting entities/applications with only the requested digital identification credential information, and did not provide the requesting entities/applications with any of the digital identification credential information stored on the first digital identification credential but that was not requested.

At FIG. 6R, in response to user input 654*b*, electronic device 600 displays transmission instance user interface 660-1 that provides the user with details about a specific transmission instance in which digital identification credential information was transmitted to an application. In FIG. 6R, user interface 660-1 includes entity information 662*b*-1 that identifies the entity and/or application that received digital identification credential information, location information 662*c*-1, 662*h*-1, 662*i*-1 corresponding to the transmission instance (e.g., the transmission took place at 401 E. Jefferson St., Phoenix, AZ), and date and time information 662*d*-1 corresponding to the transmission instance (e.g., the transmission occurred at 10:09 AM on March 1). User interface 660-1 also includes digital identification credential indication 662*e*-1 which identifies the first digital identification credential, requested and stored information 662*f*-1 (e.g., information that was provided to the application and was stored by the application), and requested and not stored information 662*g*-1 (e.g., information that was provided to the application but was not stored by the application). User interface 660-1 also includes option 662*j*-1 that is selectable to initiate a process for removing transmission instance information corresponding to this transmission instance from user interface 648 of FIG. 6P, thereby providing the user with increased privacy.

At FIG. 6S, in response to user input 654*c*, electronic device 600 displays transmission instance user interface 660-2 that provides the user with details about a specific transmission instance in which digital identification credential information was transmitted to an application. In FIG. 6S, user interface 660-2 includes entity information 662*b*-2 that identifies the entity and/or application that received digital identification credential information (e.g., "Food Delivery" application), and date and time information 662*d*-2 corresponding to the transmission instance (e.g., the transmission occurred at 10:09 AM on March 1). User interface 660-2 also includes digital identification credential indication 662*e*-2 that identifies the first digital identification credential, and requested and stored information 662*f*-2 (e.g., digital identification credential information that was provided to the application and was stored by the application). User interface 660-2 also includes option 662*j*-2 that is selectable to initiate a process for removing transmission instance information corresponding to this transmission instance from user interface 648 of FIG. 6P.

FIG. 7 is a flow diagram illustrating a method for managing and using digital identification credentials using a computer system in accordance with some embodiments. Method 700 is performed at a computer system (e.g., 100, 300, 500, and/or 600) (e.g., a wearable device, a smart watch, a smart phone, a tablet, a head mounted device (e.g., a head mounted augmented reality and/or extended reality device), and/or a computer system controlling an external display) that is in communication with a display generation component (e.g., a display controller, a touch-sensitive display system; a head mounted displayed system; and/or a display (e.g., integrated and/or connected)) and one or more input devices (e.g., a touch-sensitive surface (e.g., a touch-sensitive display); an accelerometer; a rotatable input mechanism; a depressible input mechanism; and/or a rotatable and depressible input mechanism). Some operations in method 700 are, optionally, combined, the orders of some operations are, optionally, changed, and some operations are, optionally, omitted.

As described below, method 700 provides an intuitive way for using and managing digital identification credentials. The method reduces the cognitive burden on a user for using and managing digital identification credentials, thereby creating a more efficient human-machine interface. For battery-operated computing devices, enabling a user to use and manage digital identification credentials faster and more efficiently conserves power and increases the time between battery charges.

The computer system (e.g., 600) displays (702), via the display generation component (e.g., 602), a first user interface (e.g., 612, 630, 640) (e.g., a first user interface generated by the first application) corresponding to a first application (e.g., a first application running on the computer system and/or a third party application).

The computer system receives (704), from the first application, a request for digital identification of a user. In some embodiments, the request for digital identification is caused by and/or generated by the first application.

In response to (708) receiving, from the first application, the request for digital identification of a user: the computer system (e.g., 600) displays (708), via the display generation component (e.g., 602), a second user interface (e.g., 618) corresponding to a second application (e.g., a second application running on the computer system) (e.g., a wallet application and/or a digital identification application) (e.g., a first-party application, an application provided by the manufacturer of the computer system, and/or an application that is part of the operating system) different from the first application, wherein the second application has access to (e.g., is authorized to access and/or stores) a first set of digital identification information (e.g., FIG. 6R, information corresponding to digital identification credential 608d) (e.g., digital identification credential 608d) corresponding to the user. In some embodiments, the second user interface (e.g., 618) is displayed while maintaining display of at least a portion of the first user interface (e.g., 612, 630, 640) (e.g., the second user interface is displayed concurrently with at least a portion of the first user interface). In some embodiments, the second user interface overlays at least a portion of the first user interface. In some embodiments, the digital identification information (e.g., the first set of digital identification information corresponding to the user) corresponds to a digital identification account (e.g., digital identification credential 608d) that is stored as part of an electronic wallet (e.g., storing digital identification information/credentials in a secure element of the computer system). The digital identification account does not include payment information (e.g., is not a debit card, credit card, or payment card). The electronic wallet stores one or more other accounts that correspond to payment accounts (e.g., 608a-608c) (e.g., debit card, credit card, and/or payment card). The digital identification information corresponds to a government-issued identification account.

While displaying the second user interface (e.g., 618), the computer system receives (710), via the one or more input devices, a first set of user inputs (e.g., 622 and/or 636) (e.g., one or more user inputs) (e.g., one or more button presses, one or more touch inputs, one or more biometric inputs (e.g., facial scan, eye scan, and/or fingerprint scan)).

In response to (712) receiving the first set of user inputs (e.g., 622 and/or 636): in accordance with a determination that the first set of user inputs satisfies authorization criteria, the computer system provides (714), to the first application, a first subset (e.g., 620c and/or 620h) of the first set of digital identification information corresponding to the user (e.g., the first subset includes all of the first set of digital identification information corresponding to the user or the first subset includes less than all of the first set of digital identification information corresponding to the user (e.g., providing the first subset without providing a second subset of the first set of digital identification information corresponding to the user)).

In some embodiments, in response to receiving the first set of user inputs (e.g., 622, 636), and in accordance with a determination that the first set of user inputs does not satisfy the authorization criteria, the computer system forgoes providing the first application with the first subset of the first set of digital identification information corresponding to the user (e.g., FIG. 6G). In some embodiments, the computer system displays a third user interface (e.g., 626) indicating that the first set of user inputs does not satisfy the authorization criteria. In some embodiments, the request for digital identification of the user requests a first subset of the first set of digital identification information corresponding to the user, and does not request a second subset of the first set of digital identification information corresponding to the user. Displaying a second user interface corresponding to a second application in response to receiving the request for digital identification of a user from a first application provides feedback about the state of the device (e.g., that the device has received a request for digital identification of a user from the first application). Providing a subset of digital identification information if the first set of user inputs satisfies authorization criteria provides enhanced security by preventing unauthorized users from initiating sensitive operations.

In some embodiments, the second user interface (e.g., 618) corresponding to the second application identifies (e.g., indicates, displays, and/or presents) the first subset of the first set of digital identification information corresponding to the user (e.g., 620c, 620h). In some embodiments, the second user interface (e.g., 618) does not identify (e.g., does not display and/or present) a second subset of the first set of digital identification information corresponding to the user different from the first subset. In some embodiments, the second user interface does not identify (e.g., does not display and/or present) digital identification information corresponding to the user that is not in the first subset of the first set of digital identification information corresponding to the user (e.g., does not identify digital identification information corresponding to the user that is not being requested by the first application). In some embodiments, the first application does not have access to the first set of digital identification information and/or the first subset of the first set of digital identification information except what is provided to the first application by the second application. In some embodiments, the request that is received from the first application for digital identification of the user includes a request for the first subset of the first set of digital identification information corresponding to the user and does not include a request for the second subset of the first set of digital identification information corresponding to the user. In some embodiments, information based on the request (e.g., the request itself or the digital identification information requested) is transmitted to the second application. Displaying, within the second user interface, the first subset of the first set of digital identification information corresponding to the user provides feedback about the state of the device (e.g., that the device has received, from the first application, a request for the first subset of the first set of digital identification information corresponding to the user).

In some embodiments, the computer system receives, via the one or more input devices, a request to unlock the computer system (e.g., one or more user inputs (e.g., one or more touch inputs, non-touch inputs, gesture inputs, and/or non-gesture inputs)) (e.g., a request to transition the computer system from a locked state to an unlocked state). In some embodiments, subsequent to receiving the request to unlock the computer system (in some embodiments, in response to receiving the request to unlock the computer system), the computer system receives, via the one or more input devices, first biometric information corresponding to a user (e.g., a facial scan, a fingerprint scan, and/or an eye scan). In some embodiments, in response to receiving the first biometric information corresponding to the user: in accordance with a determination that the first biometric information corresponds to (e.g., matches and/or satisfies a similarity threshold relative to) a first biometric profile (e.g., a first biometric profile stored on the computer system and/or accessible to the computer system)(e.g., a first facial scan profile, a first eye scan profile, and/or a first fingerprint scan profile), the computer system unlocks the computer system (and, optionally, in some embodiments, the computer system displays an unlocked user interface indicative of the computer system transitioning to the unlocked state); in accordance with a determination that the first biometric information corresponds to (e.g., matches and/or satisfies a similarity threshold relative to) a second biometric profile (e.g., a second biometric profile stored on the computer system and/or accessible to the computer system)(e.g., a second facial scan profile, a second eye scan profiled, and/or a second fingerprint scan profile) different from the first biometric profile, the computer system unlocks the computer system (and, optionally, in some embodiments, the computer system displays an unlocked user interface indicative of the computer system transitioning to the unlocked state); and in accordance with a determination that the first biometric information corresponding to a user does not correspond to (e.g., does not match and/or does not satisfy a similarity threshold relative to) a known biometric profile (e.g., does not match a biometric profile that is stored on the computer system and/or is accessible to the computer system and/or a biometric profile that corresponds to a known and/or registered user) (e.g., does not match the first biometric profile or the second biometric profile), the computer system forgoes unlocking the computer system (e.g., maintains the computer system in the locked state and/or maintaining display of a locked user interface indicative of the computer system being in the unlocked state).

In some embodiments, in response to receiving the first set of user inputs (e.g., 622, 636, and/or biometric information collected in FIGS. 6D and 6J), wherein the first set of user inputs includes second biometric information (e.g., "Face Identification" in FIGS. 6D and 6J) (e.g., a facial scan, a fingerprint scan, and/or an eye scan) corresponding to a user: in accordance with a determination that the first set of user inputs satisfies authorization criteria, including a determination that the second biometric information corresponds to (e.g., matches and/or satisfies a similarity threshold relative to) the first biometric profile, the computer system provides, to the first application, the first subset of the first set of digital identification information corresponding to the user (e.g., FIGS. 6E, 6K); and in accordance with a determination that the first set of user inputs does not satisfy authorization criteria, including a determination that the second biometric information corresponds to (e.g., matches and/or satisfies a similarity threshold relative to) the second biometric profile (e.g., and does not correspond to the first biometric profile), the computer system forgoes providing the first subset of the first set of digital identification information corresponding to the user to the first application (e.g., FIG. 6G) (and, optionally, in some embodiments, the computer system displays a user interface (e.g., 626) indicating that the first subset of the first set of digital identification information corresponding to the user has not been provided to the first application). In some embodiments, the first set of user inputs includes the second biometric information and one or more additional user inputs (e.g., 622, 636) (e.g., one or more touch inputs, one or more non-touch inputs, one or more button presses, and/or one or more gestures).

In some embodiments, the computer system stores and/or has access to a plurality of biometric profiles corresponding to a plurality of users. In some embodiments, the plurality of users are authorized to unlock the computer system, and biometric information corresponding to any one of the plurality of users will unlocked the computer system. In some embodiments, the first set of digital identification information corresponds to a first user of the plurality of users. In some embodiments, the first biometric profile corresponds to the first user of the plurality of users, and the second biometric profile corresponds to a second user of the plurality of users different from the first user. In some embodiments, the authorization criteria includes a criterion that is satisfied if the first set of user inputs includes biometric information corresponding to the first user. Accordingly, if the first set of user inputs includes biometric information corresponding to the second user (rather than the first user), the authorization criteria are not satisfied and digital identification information corresponding to the first user is not provided to the first application. Providing digital identification information to the first application if the second biometric information corresponds to the first biometric profile, and forgoing providing digital identification information to the first application if the second biometric information corresponds to a second biometric profile (e.g., and does not correspond to the first biometric profile) improves device security and privacy by preventing unauthorized users from sharing digital identification information.

In some embodiments, the computer system displays the first user interface (e.g., 612, 630, 640) and concurrently displays, within the first user interface: a first selectable option (e.g., 614*a*, 632*a*) that is selectable to initiate a process for user identity verification using the second application including causing the first application to transmit, to the second application, the request for digital identification of the user (e.g., a second selectable option that is selectable to cause the computer system to display the second user interface corresponding to (e.g., displayed by and/or generated by) the second application and/or a fourth user interface corresponding to (e.g., displayed by and/or generated by) the second application); and a second selectable option (e.g., 614b, 632b) that is selectable to initiate a process for user identity verification without using the second application (e.g., a first selectable option that corresponds to a request to verify identity information corresponding to the user in person and/or a first selectable option that is selectable to display an identity verification user interface corresponding to the first application (e.g., generated by and/or displayed by the first application (and, in some embodiments, not generated by and/or displayed by the second application))) (e.g., without invoking the second application and/or without displaying the second user interface corresponding to the second application).

In some embodiments, while displaying the first user interface (e.g., 612, 630, 640), including concurrently displaying the first selectable option (e.g., 614a, 632a) and the second selectable option (e.g., 614b, 632b), the computer system receives a user input (e.g., a touch input, a non-touch input, a gesture input, and/or a non-gesture input); and in response to receiving the user input: in accordance with a determination that the user input corresponds to selection of the first selectable option (e.g., 616, 634), the computer system displays, via the display generation component, a user interface (e.g., 618) corresponding to (e.g., generated by and/or displayed by) the second application (the second user interface and/or a different user interface corresponding to (e.g., displayed by and/or generated by) the second application); and in accordance with a determination that the user input corresponds to selection of the second selectable option, the computer system forgoes displaying the user interface corresponding to the second application (e.g., 618) (and, optionally, displays a user interface corresponding to (e.g., displayed by and/or generated by) the first application). Displaying a first selectable option that is selectable to initiate a process for user identity verification using the second application reduces the number of inputs needed to perform user identity verification.

In some embodiments, subsequent to providing, to the first application, the first subset of the first set of digital identification information corresponding to the user, the computer system displays, via the display generation component, a third user interface (e.g., 612 in FIG. 6F and 630 in FIG. 6L) corresponding to (e.g., generated by and/or displayed by) the first application, wherein the third user interface is different from the first user interface and the second user interface (e.g., 612 in FIG. 6F includes option 624a, 624b that were not previously displayed). In some embodiments, the user interface does not correspond to (e.g., is not generated by and/or is not displayed by) the second application. In some embodiments, subsequent to receiving the first set of user inputs and/or subsequent to providing, to the first application, the first subset of the first set of digital identification information corresponding to the user, the computer system ceases display of the second user interface. In some embodiments, subsequent to receiving the first set of user inputs and/or subsequent to providing, to the first application, the first subset of the first set of digital identification information corresponding to the user, the computer system ceases display of the first user interface. Displaying the third user interface corresponding to the first application after providing the first application with the first subset of the first set of digital identification information provides feedback about the state of the device (e.g., that digital identification information corresponding to the user has been provided to the first application).

In some embodiments, the second user interface (e.g., 618) corresponding to the second application identifies the first application (e.g., 620a ("food delivery" in FIG. 6C; "event concessions" in FIG. 6I)) (e.g., displays a name of the first application and/or a visual indication (e.g., an icon and/or a glyph) corresponding to the first application). Having the second user interface identify the first application provides improved security/privacy by ensuring that the user knows which application is requesting and/or receiving digital identification information corresponding to the user.

In some embodiments, the second user interface corresponding to the second application identifies (e.g., presents and/or displays) the first subset of the first set of digital identification information (e.g., 620c, 620h) corresponding to the user (e.g., identifies which information of the first set of digital identification information is being requested by the first application and/or will be provided to the first application). In some embodiments, the second user interface does not identify digital identification information that is in the first set of digital identification information but is not in the first subset of the first set of digital identification information (e.g., the second user interface does not identify digital identification information that is not being requested by the first application and/or will not be provided to the first application). Having the second user interface identify the first subset of the first set of digital identification information provides improved security/privacy by ensuring that the user knows what digital identification information is being requested by and/or will be provided to the first application.

In some embodiments, the second user interface corresponding to the second application identifies (e.g., presents and/or displays) first digital identification information (e.g., 620c) that is being requested by the first application (e.g., first digital identification information that is part of the first subset of the first set of digital identification information) and indicates that the first digital identification information will be stored by the first application (e.g., "WILL BE STORED BY THE APP FOR 30 DAYS" in FIGS. 6C, 6I) (e.g., will be stored by the first application for greater than a threshold duration of time and/or will be stored by the first application in memory that resides outside of and/or separate from the computer system). In some embodiments, the second user interface identifies second digital identification information that is being requested by the first application and indicates that the second digital identification will also be stored by the first application (e.g., will be stored by the first application for greater than a threshold duration of time and/or will be stored by the first application in memory that resides outside of and/or separate from the computer system). Having the second user interface identify which digital identification information will be stored by the first application provides improved security and privacy by ensuring that the user knows what digital identification information will be stored by the first application.

In some embodiments, the computer system displays the second user interface includes concurrently displaying: first content (e.g., 620c) (e.g., textual content and/or non-textual content) identifying the first digital identification information (e.g., first content indicating that the first application is requesting the first digital identification information), wherein the first content is displayed in a first manner (e.g., displayed with a first visual indication and/or displayed in a first region of the second user interface) indicating that the first digital identification information will be stored by the first application (e.g., FIG. 6I, 620c displayed in a first region of user interface) (e.g., will be stored by the first application for greater than a threshold duration of time and/or will be stored by the first application in memory that resides outside of and/or separate from the computer system); and second content (e.g., textual content and/or non-textual content) identifying second digital identification information (e.g., 620h) (e.g., second content indicating that the first application is requesting the second digital identification information) different from the first digital identification information, wherein the second content is displayed in a second manner (e.g., displayed without the first visual indication, displayed with a second visual indication, and/or displayed in a second region of the second user interface) different from the first manner indicating that the second digital identification information will not be stored by the first application (e.g., 620h displayed in second region of user interface) (e.g., will be provided to the first application, but will not be stored by the first application) (e.g., will not be stored by the first application for greater than a threshold duration of time and/or will not be stored by the first application in memory that resides outside of and/or separate from the computer system).

In some embodiments, displaying the second user interface (e.g., 618) further includes, concurrently displaying, with the first content and the second content: third content identifying third digital identification information, wherein the third content is displayed in the first manner indicating that the third digital identification information will be stored by the first application. In some embodiments, displaying the second user interface further includes, concurrently displaying, with the first content, the second content, and/or the third content: fourth content identifying fourth digital identification information, wherein the fourth content is displayed in the second manner indicating that the fourth digital identification information will not be stored by the first application. Having the second user interface identify which digital identification information will be stored by the first application and which digital identification information will not be stored by the first application provides improved security and privacy by ensuring that the user knows what digital identification information will be stored by the first application.

In some embodiments, the second user interface (e.g., 618) displays an indication (e.g., a visual indication, a textual indication, and/or a non-textual indication) of how long (e.g., how many hours, days, weeks, months, and/or years) the first digital identification information will be stored by the first application (e.g., "30 DAYS" in FIGS. 6C and 6I). Having the second user interface identify how long digital identification information will be stored by the first application provides improved security and privacy by ensuring that the user knows what digital identification information will be stored by the first application and for how long.

In some embodiments, the first subset of the first set of digital identification information corresponding to the user includes an indication of whether the user satisfies an age threshold (e.g., "AGE OVER 21" in FIGS. 6C and 6I) (e.g., includes the user's birthday, the user's age, and/or a binary indication of whether the user satisfies the age threshold without identifying the user's actual age). Automatically providing the first application with an indication of whether the user satisfies an age threshold in response to a determination that authorization criteria are satisfied allows the user to provide digital identification information with fewer user inputs.

In some embodiments, the first set of digital identification information corresponding to the user is associated with a geographic region (in some embodiments, the first set of digital identification information corresponds to a digital identification credential (e.g., card and/or license) that is issued by and/or authorized by a jurisdiction and/or entity that corresponds to the geographic region (e.g., issued by and/or authorized by a state and/or country)), and the first subset of the first set of digital identification information includes an indication of the geographic region (e.g., "STATE" in FIGS. 6C and 6I) (e.g., the first subset of the first set of digital identification information identifies the geographic region). Automatically providing the first application with geographic region information corresponding to the user and/or corresponding to the first set of digital identification information in response to a determination that authorization criteria are satisfied allows the user to provide digital identification information with fewer user inputs.

In some embodiments, the first subset of the first set of digital identification information corresponding to the user includes a photograph of the user (e.g., "PHOTO ID" in FIGS. 6C and 6I). In some embodiments, the first set of digital identification corresponding to the user is a digital representation of a physical identification card, and the photograph of the user is a photograph of the user that is displayed on the physical identification card. In some embodiments, the first set of digital identification information corresponds to a digital identification credential (e.g., card and/or license) that is issued and/or authorized by an entity or jurisdiction, and the photograph of the user is a photograph of the user that corresponds to the digital identification credential. Automatically providing the first application with a photograph of the user in response to a determination that authorization criteria are satisfied allows the user to provide digital identification information with fewer user inputs.

In some embodiments, the first application is requesting digital identification of the user (e.g., is requesting the first subset of the first set of digital identification information corresponding to the user) in order to verify that the user is authorized to create a user account for a child (e.g., FIGS. 6M-6N) (e.g., in order to verify that the user satisfies an age threshold required to create a user account for a child and/or in order to verify that the user satisfies one or more identity criteria required to create a user account for a child) (e.g., a child that does not satisfy an age threshold and/or is below a minimum age). Ensuring that the user satisfies criteria for creating a user account for a child improves device security and privacy by ensuring that unauthorized users are not performing sensitive and/or unauthorized actions.

In some embodiments, the first application is requesting digital identification of the user (e.g., is requesting the first subset of the first set of digital identification information corresponding to the user) in order to verify that the user is authorized to complete a purchase transaction (e.g., FIGS. 6B-6L) (e.g., in order to verify that the user is authorized to make a purchase using a payment credential associated with a user and/or in order to verify that the user satisfies an age threshold required for the purchase). Ensuring that the user satisfies criteria for making a purchase improves device security and privacy by ensuring that unauthorized users are not performing sensitive and/or unauthorized actions.

In some embodiments, the computer system displays, via the display generation component, a digital identification user interface (e.g., 648, FIG. 6P) (e.g., a digital identification user interface corresponding to (e.g., displayed by and/or generated by) the second application) different from the first user interface and the second user interface, including concurrently displaying: a representation of a first transmission instance (e.g., 652c-652f) in which a subset (e.g., all of and/or less than all of) of the first set of digital identification information corresponding to the user was provided to a third application (e.g., a third application different from and/or the same as the first application); and a representation of a second transmission instance (e.g., 652c-652f) different from the first transmission instance in which a subset (e.g., all of and/or less than all of) of the first set of digital identification information corresponding to the user was provided to a fourth application (e.g., a fourth application different from and/or the same as the first application and/or the third application). In some embodiments, the representation of the first transmission instance identifies the third application. In some embodiments, the representation of the second transmission instance identifies the fourth application. Displaying a digital identification user interface in which a user can view past instances in which digital identification information was provided to an application improves device security and privacy by allowing a user to ensure that unauthorized applications are not improperly accessing digital identification information.

In some embodiments, the representation of the first transmission instance (e.g., 652c-652f) is selectable by a user to display, via the display generation component, one or more details of the first transmission instance (e.g., 660-1, 660-2) (e.g., date of the first transmission instance; time of the first transmission instance; what digital identification information of the first set of digital identification information was transmitted to the third application in the first transmission instance; what digital identification information of the first set of digital identification information was transmitted to the third application in the first transmission instance and was stored by the third application; and/or what digital identification information of the first set of digital identification information was transmitted to the third application in the first transmission instance but was not stored by the third application) (e.g., without displaying one or more details of the second transmission instance) that are not displayed in the digital identification user interface.

In some embodiments, the representation of the second transmission instance is selectable by a user to display, via the display generation component, one or more details of the second transmission instance (e.g., 660-1, 660-2) (e.g., date of the second transmission instance; time of the second transmission instance; what digital identification information of the first set of digital identification information was transmitted to the fourth application in the second transmission instance; what digital identification information of the first set of digital identification information was transmitted to the third application in the second transmission instance and was stored by the third application; and/or what digital identification information of the first set of digital identification information was transmitted to the third application in the second transmission instance but was not stored by the third application) (e.g., without displaying one or more details of the first transmission instance) that are not displayed in the digital identification user interface. Displaying representations of transmission instances that are selectable by a user to view additional details about those transmission instances improves device security and privacy by allowing a user to ensure that unauthorized applications are not improperly accessing digital identification information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve user experience when using and/or managing digital identification credentials. The present disclosure contemplates that in some instances, this gathered data may include personal information data that uniquely identifies or can be used to contact or locate a specific person. Such personal information data can include driver's license information, demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide services to the user or to facilitate transactions. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of digital identification credentials, the present technology can be configured to allow users to select to "opt in" or "opt out" of participation in the collection of personal information data during registration for services or anytime thereafter. In another example, users can select not to provide personal information, such as information associated with a digital identification credential. In yet another example, users can select to limit the length of time digital identification credential information is maintained or entirely prohibit sharing of digital identification credential information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., for how long and where), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the services, or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
   displaying, via the display generation component, a first user interface corresponding to a first application, wherein the first application does not have access to a first set of digital identification information corresponding to a user;
   receiving, from the first application, a request for digital identification of the user;
   in response to receiving, from the first application, the request for digital identification of the user:
      displaying, via the display generation component, a second user interface corresponding to a second application different from the first application, wherein the second user interface is displayed concurrently with at least a portion of the first user interface and wherein the second application has access to the first set of digital identification information corresponding to the user;
   while displaying the second user interface, receiving, via the one or more input devices, a first set of user inputs; and
   in response to receiving the first set of user inputs:
      in accordance with a determination that the first set of user inputs satisfies authorization criteria, providing, to the first application, a first subset of the first set of digital identification information corresponding to the user.

2. The computer system of claim 1, wherein the second user interface corresponding to the second application identifies the first subset of the first set of digital identification information corresponding to the user.

3. The computer system of claim 1, wherein the one or more programs further include instructions for:
   receiving, via the one or more input devices, a request to unlock the computer system;
   subsequent to receiving the request to unlock the computer system, receiving, via the one or more input devices, first biometric information corresponding to a user;
   in response to receiving the first biometric information corresponding to the user:
      in accordance with a determination that the first biometric information corresponds to a first biometric profile, unlocking the computer system;
      in accordance with a determination that the first biometric information corresponds to a second biometric profile different from the first biometric profile, unlocking the computer system; and
      in accordance with a determination that the first biometric information corresponding to a user does not correspond to a known biometric profile, forgoing unlocking the computer system; and
   in response to receiving the first set of user inputs, wherein the first set of user inputs includes second biometric information corresponding to a user:
      in accordance with a determination that the first set of user inputs satisfies authorization criteria, including a determination that the second biometric information corresponds to the first biometric profile, providing, to the first application, the first subset of the first set of digital identification information corresponding to the user; and
      in accordance with a determination that the first set of user inputs does not satisfy authorization criteria, including a determination that the second biometric information corresponds to the second biometric profile, forgoing providing the first subset of the first set of digital identification information corresponding to the user to the first application.

4. The computer system of claim 1, wherein:
displaying the first user interface includes concurrently displaying, within the first user interface:
   a first selectable option that is selectable to initiate a process for user identity verification using the second application including causing the first application to transmit, to the second application, the request for digital identification of the user; and a second selectable option that is selectable to initiate a process for user identity verification without using the second application.

5. The computer system of claim 1, wherein the one or more programs further include instructions for:

subsequent to providing, to the first application, the first subset of the first set of digital identification information corresponding to the user, displaying, via the display generation component, a third user interface corresponding to the first application, wherein the third user interface is different from the first user interface and the second user interface.

6. The computer system of claim 1, wherein the second user interface corresponding to the second application identifies the first application.

7. The computer system of claim 1, wherein the second user interface corresponding to the second application identifies first digital identification information that is being requested by the first application and indicates that the first digital identification information will be stored by the first application.

8. The computer system of claim 7, wherein displaying the second user interface includes concurrently displaying:

first content identifying the first digital identification information, wherein the first content is displayed in a first manner indicating that the first digital identification information will be stored by the first application; and second content identifying second digital identification information different from the first digital identification information, wherein the second content is displayed in a second manner different from the first manner indicating that the second digital identification information will not be stored by the first application.

9. The computer system of claim 7, wherein the second user interface displays an indication of how long the first digital identification information will be stored by the first application.

10. The computer system of claim 1, wherein the first subset of the first set of digital identification information corresponding to the user includes an indication of whether the user satisfies an age threshold.

11. The computer system of claim 1, wherein the first set of digital identification information corresponding to the user is associated with a geographic region, and the first subset of the first set of digital identification information includes an indication of the geographic region.

12. The computer system of claim 1, wherein the first subset of the first set of digital identification information corresponding to the user includes a photograph of the user.

13. The computer system of claim 1, wherein the first application is requesting digital identification of the user in order to verify that the user is authorized to create a user account for a child.

14. The computer system of claim 1, wherein the first application is requesting digital identification of the user in order to verify that the user is authorized to complete a purchase transaction.

15. The computer system of claim 1, wherein the one or more programs further include instructions for:

displaying, via the display generation component, a digital identification user interface different from the first user interface and the second user interface, including concurrently displaying:

a representation of a first transmission instance in which a subset of the first set of digital identification information corresponding to the user was provided to a third application; and a representation of a second transmission instance different from the first transmission instance in which a subset of the first set of digital identification information corresponding to the user was provided to a fourth application.

16. The computer system of claim 15, wherein:

the representation of the first transmission instance is selectable by a user to display, via the display generation component, one or more details of the first transmission instance that are not displayed in the digital identification user interface; and the representation of the second transmission instance is selectable by a user to display, via the display generation component, one or more details of the second transmission instance that are not displayed in the digital identification user interface.

17. A non-transitory computer-readable storage medium storing one or more programs configured to be executed by one or more processors of a computer system that is in communication with a display generation component and one or more input devices, the one or more programs including instructions for:

displaying, via the display generation component, a first user interface corresponding to a first application, wherein the first application does not have access to a first set of digital identification information corresponding to a user;

receiving, from the first application, a request for digital identification of the user;

in response to receiving, from the first application, the request for digital identification of the user:

displaying, via the display generation component, a second user interface corresponding to a second application different from the first application, wherein the second user interface is displayed concurrently with at least a portion of the first user interface and wherein the second application has access to the first set of digital identification information corresponding to the user;

while displaying the second user interface, receiving, via the one or more input devices, a first set of user inputs; and in response to receiving the first set of user inputs:

in accordance with a determination that the first set of user inputs satisfies authorization criteria, providing, to the first application, a first subset of the first set of digital identification information corresponding to the user.

18. The non-transitory computer-readable storage medium of claim 17, wherein the second user interface corresponding to the second application identifies the first subset of the first set of digital identification information corresponding to the user.

19. The non-transitory computer-readable storage medium of claim 17, wherein the one or more programs further include instructions for:

receiving, via the one or more input devices, a request to unlock the computer system;

subsequent to receiving the request to unlock the computer system, receiving, via the one or more input devices, first biometric information corresponding to a user;

in response to receiving the first biometric information corresponding to the user:
    in accordance with a determination that the first biometric information corresponds to a first biometric profile, unlocking the computer system;
    in accordance with a determination that the first biometric information corresponds to a second biometric profile different from the first biometric profile, unlocking the computer system; and
    in accordance with a determination that the first biometric information corresponding to a user does not correspond to a known biometric profile, forgoing unlocking the computer system; and
in response to receiving the first set of user inputs, wherein the first set of user inputs includes second biometric information corresponding to a user:
    in accordance with a determination that the first set of user inputs satisfies authorization criteria, including a determination that the second biometric information corresponds to the first biometric profile, providing, to the first application, the first subset of the first set of digital identification information corresponding to the user; and
    in accordance with a determination that the first set of user inputs does not satisfy authorization criteria, including a determination that the second biometric information corresponds to the second biometric profile, forgoing providing the first subset of the first set of digital identification information corresponding to the user to the first application.

20. The non-transitory computer-readable storage medium of claim 17, wherein:
displaying the first user interface includes concurrently displaying, within the first user interface:
    a first selectable option that is selectable to initiate a process for user identity verification using the second application including causing the first application to transmit, to the second application, the request for digital identification of the user; and
    a second selectable option that is selectable to initiate a process for user identity verification without using the second application.

21. The non-transitory computer-readable storage medium of claim 17, wherein the one or more programs further include instructions for:
subsequent to providing, to the first application, the first subset of the first set of digital identification information corresponding to the user, displaying, via the display generation component, a third user interface corresponding to the first application, wherein the third user interface is different from the first user interface and the second user interface.

22. The non-transitory computer-readable storage medium of claim 17, wherein the second user interface corresponding to the second application identifies the first application.

23. The non-transitory computer-readable storage medium of claim 17, wherein the second user interface corresponding to the second application identifies first digital identification information that is being requested by the first application and indicates that the first digital identification information will be stored by the first application.

24. The non-transitory computer-readable storage medium of claim 23, wherein displaying the second user interface includes concurrently displaying:
first content identifying the first digital identification information, wherein the first content is displayed in a first manner indicating that the first digital identification information will be stored by the first application; and
second content identifying second digital identification information different from the first digital identification information, wherein the second content is displayed in a second manner different from the first manner indicating that the second digital identification information will not be stored by the first application.

25. The non-transitory computer-readable storage medium of claim 23, wherein the second user interface displays an indication of how long the first digital identification information will be stored by the first application.

26. The non-transitory computer-readable storage medium of claim 17, wherein the first subset of the first set of digital identification information corresponding to the user includes an indication of whether the user satisfies an age threshold.

27. The non-transitory computer-readable storage medium of claim 17, wherein the first set of digital identification information corresponding to the user is associated with a geographic region, and the first subset of the first set of digital identification information includes an indication of the geographic region.

28. The non-transitory computer-readable storage medium of claim 17, wherein the first subset of the first set of digital identification information corresponding to the user includes a photograph of the user.

29. The non-transitory computer-readable storage medium of claim 17, wherein the first application is requesting digital identification of the user in order to verify that the user is authorized to create a user account for a child.

30. The non-transitory computer-readable storage medium of claim 17, wherein the first application is requesting digital identification of the user in order to verify that the user is authorized to complete a purchase transaction.

31. The non-transitory computer-readable storage medium of claim 17, wherein the one or more programs further include instructions for:
displaying, via the display generation component, a digital identification user interface different from the first user interface and the second user interface, including concurrently displaying:
    a representation of a first transmission instance in which a subset of the first set of digital identification information corresponding to the user was provided to a third application; and
    a representation of a second transmission instance different from the first transmission instance in which a subset of the first set of digital identification information corresponding to the user was provided to a fourth application.

32. The non-transitory computer-readable storage medium of claim 31, wherein:
the representation of the first transmission instance is selectable by a user to display, via the display generation component, one or more details of the first transmission instance that are not displayed in the digital identification user interface; and
the representation of the second transmission instance is selectable by a user to display, via the display generation component, one or more details of the second transmission instance that are not displayed in the digital identification user interface.

33. A method, comprising:
at a computer system that is in communication with a display generation component and one or more input devices:
displaying, via the display generation component, a first user interface corresponding to a first application, wherein the first application does not have access to a first set of digital identification information corresponding to a user;
receiving, from the first application, a request for digital identification of the user;
in response to receiving, from the first application, the request for digital identification of the user:
displaying, via the display generation component, a second user interface corresponding to a second application different from the first application, wherein the second user interface is displayed concurrently with at least a portion of the first user interface and wherein the second application has access to the first set of digital identification information corresponding to the user;
while displaying the second user interface, receiving, via the one or more input devices, a first set of user inputs; and
in response to receiving the first set of user inputs:
in accordance with a determination that the first set of user inputs satisfies authorization criteria, providing, to the first application, a first subset of the first set of digital identification information corresponding to the user.

34. The method of claim 33, wherein the second user interface corresponding to the second application identifies the first subset of the first set of digital identification information corresponding to the user.

35. The method of claim 33, further comprising:
receiving, via the one or more input devices, a request to unlock the computer system;
subsequent to receiving the request to unlock the computer system, receiving, via the one or more input devices, first biometric information corresponding to a user;
in response to receiving the first biometric information corresponding to the user:
in accordance with a determination that the first biometric information corresponds to a first biometric profile, unlocking the computer system;
in accordance with a determination that the first biometric information corresponds to a second biometric profile different from the first biometric profile, unlocking the computer system; and
in accordance with a determination that the first biometric information corresponding to a user does not correspond to a known biometric profile, forgoing unlocking the computer system; and
in response to receiving the first set of user inputs, wherein the first set of user inputs includes second biometric information corresponding to a user:
in accordance with a determination that the first set of user inputs satisfies authorization criteria, including a determination that the second biometric information corresponds to the first biometric profile, providing, to the first application, the first subset of the first set of digital identification information corresponding to the user; and
in accordance with a determination that the first set of user inputs does not satisfy authorization criteria, including a determination that the second biometric information corresponds to the second biometric profile, forgoing providing the first subset of the first set of digital identification information corresponding to the user to the first application.

36. The method of claim 33, wherein:
displaying the first user interface includes concurrently displaying, within the first user interface:
a first selectable option that is selectable to initiate a process for user identity verification using the second application including causing the first application to transmit, to the second application, the request for digital identification of the user; and
a second selectable option that is selectable to initiate a process for user identity verification without using the second application.

37. The method of claim 33, further comprising:
subsequent to providing, to the first application, the first subset of the first set of digital identification information corresponding to the user, displaying, via the display generation component, a third user interface corresponding to the first application, wherein the third user interface is different from the first user interface and the second user interface.

38. The method of claim 33, wherein the second user interface corresponding to the second application identifies the first application.

39. The method of claim 33, wherein the second user interface corresponding to the second application identifies first digital identification information that is being requested by the first application and indicates that the first digital identification information will be stored by the first application.

40. The method of claim 39, wherein displaying the second user interface includes concurrently displaying:
first content identifying the first digital identification information, wherein the first content is displayed in a first manner indicating that the first digital identification information will be stored by the first application; and
second content identifying second digital identification information different from the first digital identification information, wherein the second content is displayed in a second manner different from the first manner indicating that the second digital identification information will not be stored by the first application.

41. The method of claim 39, wherein the second user interface displays an indication of how long the first digital identification information will be stored by the first application.

42. The method of claim 33, wherein the first subset of the first set of digital identification information corresponding to the user includes an indication of whether the user satisfies an age threshold.

43. The method of claim 33, wherein the first set of digital identification information corresponding to the user is associated with a geographic region, and the first subset of the first set of digital identification information includes an indication of the geographic region.

44. The method of claim 33, wherein the first subset of the first set of digital identification information corresponding to the user includes a photograph of the user.

45. The method of claim 33, wherein the first application is requesting digital identification of the user in order to verify that the user is authorized to create a user account for a child.

46. The method of claim 33, wherein the first application is requesting digital identification of the user in order to verify that the user is authorized to complete a purchase transaction.

47. The method of claim 33, further comprising:
displaying, via the display generation component, a digital identification user interface different from the first user interface and the second user interface, including concurrently displaying:
- a representation of a first transmission instance in which a subset of the first set of digital identification information corresponding to the user was provided to a third application; and
- a representation of a second transmission instance different from the first transmission instance in which a subset of the first set of digital identification information corresponding to the user was provided to a fourth application.

48. The method of claim 47, wherein:
the representation of the first transmission instance is selectable by a user to display, via the display generation component, one or more details of the first transmission instance that are not displayed in the digital identification user interface; and
the representation of the second transmission instance is selectable by a user to display, via the display generation component, one or more details of the second transmission instance that are not displayed in the digital identification user interface.

* * * * *